US011105918B2

(12) United States Patent
Achour et al.

(10) Patent No.: US 11,105,918 B2
(45) Date of Patent: Aug. 31, 2021

(54) NODAL METAMATERIAL ANTENNA SYSTEM

(71) Applicant: Metawave Corporation, Palo Alto, CA (US)

(72) Inventors: Maha Achour, Encinitas, CA (US); Tim Curley, San Carlos, CA (US); Matthew Harrison, Palo Alto, CA (US)

(*) Notice: Subject to any disclaimer, the term of this patent is extended or adjusted under 35 U.S.C. 154(b) by 420 days.

(21) Appl. No.: 15/984,222

(22) Filed: May 18, 2018

(65) Prior Publication Data

US 2018/0348365 A1 Dec. 6, 2018

Related U.S. Application Data

(60) Provisional application No. 62/515,045, filed on Jun. 5, 2017, provisional application No. 62/613,675, filed
(Continued)

(51) Int. Cl.
| | | |
|---|---|---|
| *G01S 13/931* | (2020.01) | |
| *H01Q 1/32* | (2006.01) | |
| *H01Q 3/26* | (2006.01) | |
| *H01Q 3/46* | (2006.01) | |
| *G01S 7/00* | (2006.01) | |
| *G01S 13/91* | (2006.01) | |
| *H01Q 3/24* | (2006.01) | |

(Continued)

(52) U.S. Cl.
CPC ......... *G01S 13/931* (2013.01); *G01S 7/003* (2013.01); *G01S 13/91* (2013.01); *H01Q 1/3233* (2013.01); *H01Q 3/24* (2013.01); *H01Q 3/26* (2013.01); *H01Q 3/46* (2013.01); *H01Q 15/0086* (2013.01); *G01S 2013/0254* (2013.01)

(58) Field of Classification Search
None
See application file for complete search history.

(56) References Cited

U.S. PATENT DOCUMENTS

| | | | |
|---|---|---|---|
| 6,492,949 B1 | 12/2002 | Breglia et al. | |
| 6,768,453 B2 | 7/2004 | Solbach | |

(Continued)

FOREIGN PATENT DOCUMENTS

| | | |
|---|---|---|
| CN | 102365789 A | 2/2012 |
| JP | 2016-20899 A | 2/2016 |
| KR | 101527771 B1 | 6/2015 |

OTHER PUBLICATIONS

Koch, R. et al. "Detection and Purging of Specular Reflective and Transparent Object Influences in 3D Range Measurements," ISPRS—International Archives of the Photogrammetry, Remote Sensing and Spatial Information Sciences, vol. XLII-2/W3, 2017, pp. 377-384.
Mhih, V. et al. "Human-level control through deep reinforcement learning," Nature 518, pp. 529-33, Feb. 2015.
Limberger, F. et al. "Real-Time Detection of Planar Regions in Unorganized Point Clouds," Pattern Recognition, 48(6), pp. 2043-2053, Jun. 2015.

(Continued)

*Primary Examiner* — Whitney Moore
(74) *Attorney, Agent, or Firm* — Sandra Lynn Godsey

(57) ABSTRACT

The present invention is a nodal radar system having a metamaterial-based object detection system. An intelligent antenna metamaterial interface (IAM) associates specific metamaterial unit cells into sub-arrays to adjust the beam width of a transmitted signal. The nodal radar system is positioned on infrastructure to complement sensor information from mobile vehicles and devices within an environment.

19 Claims, 17 Drawing Sheets

Related U.S. Application Data on Jan. 4, 2018, provisional application No. 62/651,050, filed on Mar. 30, 2018.

(51) Int. Cl.
  *H01Q 15/00* (2006.01)
  *G01S 13/02* (2006.01)

(56) References Cited

U.S. PATENT DOCUMENTS

| | | |
|---|---|---|
| 7,250,908 B2 | 7/2007 | Lee |
| 8,633,866 B2 | 1/2014 | Sarabandi et al. |
| 8,754,810 B2 | 6/2014 | Guo et al. |
| 9,545,923 B2 | 1/2017 | Casse et al. |
| 9,786,986 B2 | 10/2017 | Johnson et al. |
| 2016/0011307 A1 | 1/2016 | Casse et al. |
| 2016/0013531 A1 | 1/2016 | Casse et al. |
| 2016/0061935 A1 | 3/2016 | McCloskey et al. |
| 2016/0134022 A1 | 5/2016 | Alexopoulos et al. |
| 2016/0233588 A1 | 8/2016 | Bily et al. |
| 2018/0348374 A1* | 12/2018 | Laddha ............ G01S 7/4808 |

OTHER PUBLICATIONS

Seyfioglu, M. S., et al. "Deep Convolutional Autoencoder for Radar-Based Classification of Similar Aided and Unaided Human Activities," IEEE Transactions on Aerospace and Electronic Systems, vol. 54, issue 4, pp. 1709-1723, Aug. 2018.

Guzman-Quiros, Raul et al. "Advances in Electronically Reconfigurable LWAs in Fabry-Pérot and SIW Technologies", 7th European Conference on Antennas and Propagation, EuCAP 2013. 2001-2005.

Wang, Yifu et al. "Tunable I-shaped metamaterial by loading varactor diode for reconfigurable antenna", Applied Physics A, May 26, 2011, 1243-1247.

Zhang, Miao et al. "Design of a Double-Layer Slotted Waveguide Array with a Partially Corporate Feed Circuit Installed in the Bottom Layer and its Fabrication by Diffusion Bonding of Laminated Thin Plates in 38GHz Band" The 2009 International Symposium on Antennas and Propogation, ISAP 2009, Oct. 20-23. 373-376.

Zhou, Y. et al. "VoxelNet: End-to-End Learning for Point Cloud Based 3D Object Detection" Nov. 2017 pp. 1-10.

\* cited by examiner

THREE LAYER, PROBE FED MTM ANTENNA STRUCTURE

TWO LAYER, PROBE FED MTM ANTENNA STRUCTURE

NODAL METAMATERIAL ANTENNA SYSTEM

CROSS REFERENCE TO RELATED APPLICATIONS

This application claims priority to:

U.S. Provisional Patent Application No. 62/515,045 entitled "INTELLIGENT ANTENNA METAMATERIAL METHOD AND APPARATUS," by Maha Achour, filed Jun. 5, 2017, having Attorney Docket No. MW2017US1P1;

U.S. Patent Application No. 62/613,675 entitled "METHOD AND APPARATUS FOR OBJECT DETECTION USING CONVOLUTIONAL NEURAL NETWORK SYSTEMS," by Matt Harrison, filed Jan. 4, 2018, having Attorney Docket No. MW2017016US1P1;

U.S. Provisional Patent Application No. 62/651,050, entitled "METHOD AND APPARATUS ANTENNA WITH DECISION CONTROL", by Matt Harrison, filed Mar. 30, 2018, having Attorney Docket No. MW-10024.USP1; and PCT Patent Application No. PCT/US18/30541 entitled "INTELLIGENT ANTENNA METAMATERIAL METHOD AND APPARATUS," by Maha Achour, filed May 1, 2018, having Attorney Docket No. MW-10001.WO1.

FIELD OF THE INVENTION

The present invention relates to intelligent antennas using metamaterial structures and providing dynamic control of metamaterial unit cells in the metamaterial structures for radar systems.

BACKGROUND

Antennas are used in everyday life for communication systems, sensing devices, radar systems and so forth. Recently there is attention given to autonomous, or self-driving, vehicles. The designs and products contemplated today do not consider all the weather conditions, power consumption constraints and timing required for effective control of a vehicle. There is a need to provide a sensing system that works over the range of road, weather, temperature, visibility, traffic conditions and so forth, while maintaining consistent reliable service.

BRIEF DESCRIPTION OF THE FIGURES

Embodiments of the present invention are described with respect to the figures. These are not drawn to scale and are drawn to clearly identify what applicant claims as the invention.

DETAILED DESCRIPTION

Figure 1:
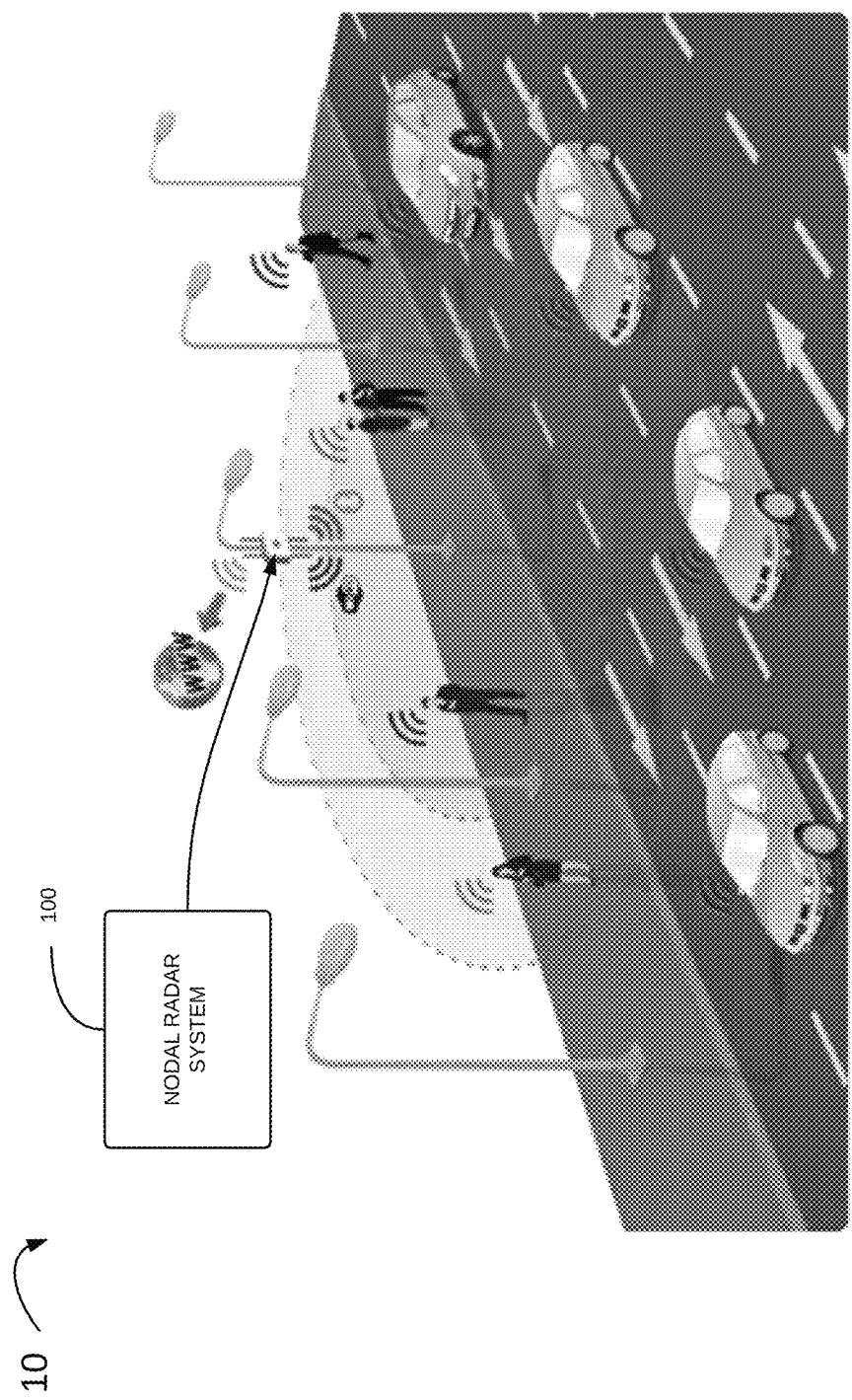
FIG. 1 illustrates a nodal radar system, according to embodiments of the present invention.

Autonomous driving is quickly moving from the realm of science fiction to becoming an achievable reality. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on.

An aspect of making this work is the ability to detect and classify objects in the surrounding environment at the same or possibly even better level as humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

In addition to moving vehicles and devices, the present invention presents metamaterial antenna arrays for infrastructure and stationary structures to facilitate additional views, information and warnings to a moving vehicle. The antenna arrays are positioned to scan the area around them and identify objects as a complementary source of information for the vehicle. In addition, these fixed radar systems are flexible and responsive; they may be used to alert to severe weather conditions, such as flooding or snow, they may anticipate actions of a pedestrian or vehicle, and they may predict traffic congestion, alert to safety and/or security concerns, and act as a digital eye for the surrounding area. This information may be used as feedback to the vehicle, to the infrastructure control, to environmental agencies and so forth. In some examples, the radar detects traffic levels and then uses this information to provide real time data to the traffic controls, such as traffic signals. These digital eyes may respond to requests from throughout the environment, such as to interface with Internet of Things (IoT) devices.

The proliferation of devices and sensors enables rapid responses over a range of applications. For example, a radar sensor applied to a traffic light would be able to detect bicycles and pedestrians in specific locations and lanes. The MTM radar disclosed herein may use a coarse scan for such identification. Similarly, an MTM radar on highways would be able to communicate with a vehicle's GPS and provide advance warning of an upcoming exit or lane change. Similarly, an MTM radar sensor near a fueling location may provide an indication to vehicles that this is the last fueling station for a given distance and provide directions for fueling.

The present invention describes an antenna system having an antenna configured with metamaterial (MTM) cells and controlled by an Intelligent Antenna MTM interface (IAM). The antenna system may be used in applications including cellular communication networks, vehicle-to-vehicle communication systems, object detection systems, autonomous vehicle sensor systems, drone control and communication systems, and so forth. The MTM antenna structure is dynamically controlled by the IAM; control may be done by changing the electrical or electromagnetic configuration of the antenna structure. In some embodiments, varactors are coupled to the MTM antenna structure to enable adjustment of the radiation pattern. In some embodiments, the MTM unit cells may be configured into subarrays that have specific characteristics. For use in an autonomous vehicle, the system may perform a coarse focus with a large beam width as an ambient condition, and then narrow the beam width when an echo is received, indicating an object is within the field of view of the antenna structure's radiation pattern. In this way, the larger beam width may sweep the full Field of View (FoV) of the antenna structure, reducing the time to scan the FoV. In some embodiments, the IAM is able to detect the area of the FoV of a detected object and map that to a specific configuration of MTM unit cells and/or subarrays to focus the beam, i.e. narrow the beam width. Additionally, in some embodiments, the specific dimensions and other properties of the detected object, such as traveling velocity with respect to the antenna structure, are analyzed and a next action(s) or course of action(s) is determined. The detected object in some embodiments is then provided as a visual or graphic display, which may act as a back-up security feature for the passenger in the vehicle.

FIG. 1 illustrates a nodal radar system 10 having at least one sensor located on infrastructure, which in this scenario is a street lamp. In other scenarios, the infrastructure could be any physical location, such as infrastructure along a road including billboards, road signs and the like. The nodal radar system 100 includes an MTM radar antenna array, having an antenna controller to scan a proximate area. The nodal radar system 100 is fixed to the infrastructure and is in communication with wireless technologies and the Internet. In the present embodiment, the nodal radar system 100 includes a smart antenna that is able to steer a beam in a variety of directions so as to detect objects within a given area. The beam is steered by control of a plurality of MTM unit cells that form a radiating element. The MTM unit cells are configured for transmission of the radiation beam and for receiving reflections, or echoes, of the radiation beam as it interacts with objects. The nodal radar system 100 includes a control mechanism to adjust the reactance behavior of the MTM unit cells and thereby steer and adjust the radiation beam and receiver. The ability to detect objects and activities within the surrounding area with the nodal radar system 100 may be used to complement the radar and other sensors within a vehicle or device. For example, the nodal radar system 100 may detect a pedestrian about to cross an intersection and send a communication to vehicles in the area to focus on a specific area where the pedestrian is traveling. The vehicle radar, or other sensor system, is then alerted to focus attention on that area. This enables advanced information for the vehicle control system(s). While the present embodiment provides the ability to steer the beam, some embodiments incorporate fixed radar beams to scan the area at specific transmission angles.

The nodal radar system 100 has an object detection capability to recognize objects and movement within the area. This may be an artificial intelligence system or other method. As the nodal radar system 100 operates, it is able to capture real time data and determine if it is operating sufficiently. For example, when the nodal radar system 100 sends a message to a vehicle incorrectly identifying a dog in the road, the vehicle may respond with a more specific identification of a cardboard box. Note that the nodal radar system 100 may have fewer object recognition capabilities and less processing power than some vehicle radars. In this way, the nodal radar system 100 is able to enhance and improve its object recognition capabilities, such as through training of a neural network or expert system, and by capturing real time data from surrounding vehicle radars and other such devices.

Figure 2:
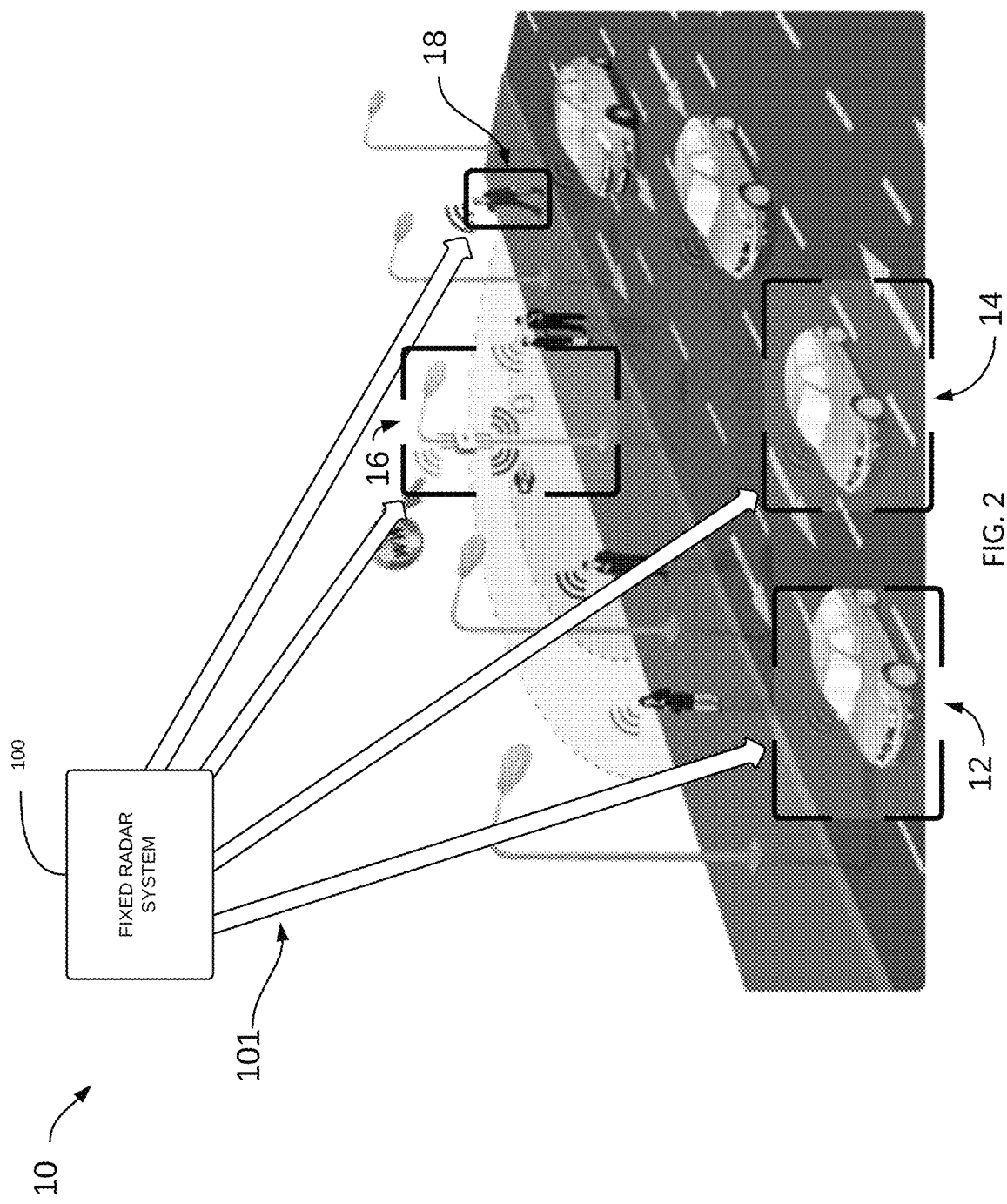
FIG. 2 illustrates operation of a nodal radar system as in FIG. 1, according to embodiments of the present invention.

FIG. 2 illustrates the nodal radar system 100 in operation, wherein nodal radar system 100 scans the area with transmission beams 101, which detect cars, people, lamps and so forth. The variety of objects and devices within this environment may change quickly, and so the nodal radar system 100 acts as a complement to object detection devices within the vehicles. As illustrated, the nodal radar system 100 detects a car in an area 12, another car in area 14, a lamp in area 16 and a person in area 18. The nodal radar system 100 may also detect the other objects in the environment, but these are provided as examples. Once an object is detected, the system 100 determines a portion of the antenna array to allocate to a scan for that object. This allocation is based on the size of the object, the reflectivity or return signal strength of the object, the location of the object, the velocity of the object and other parameters.

Figure 3:
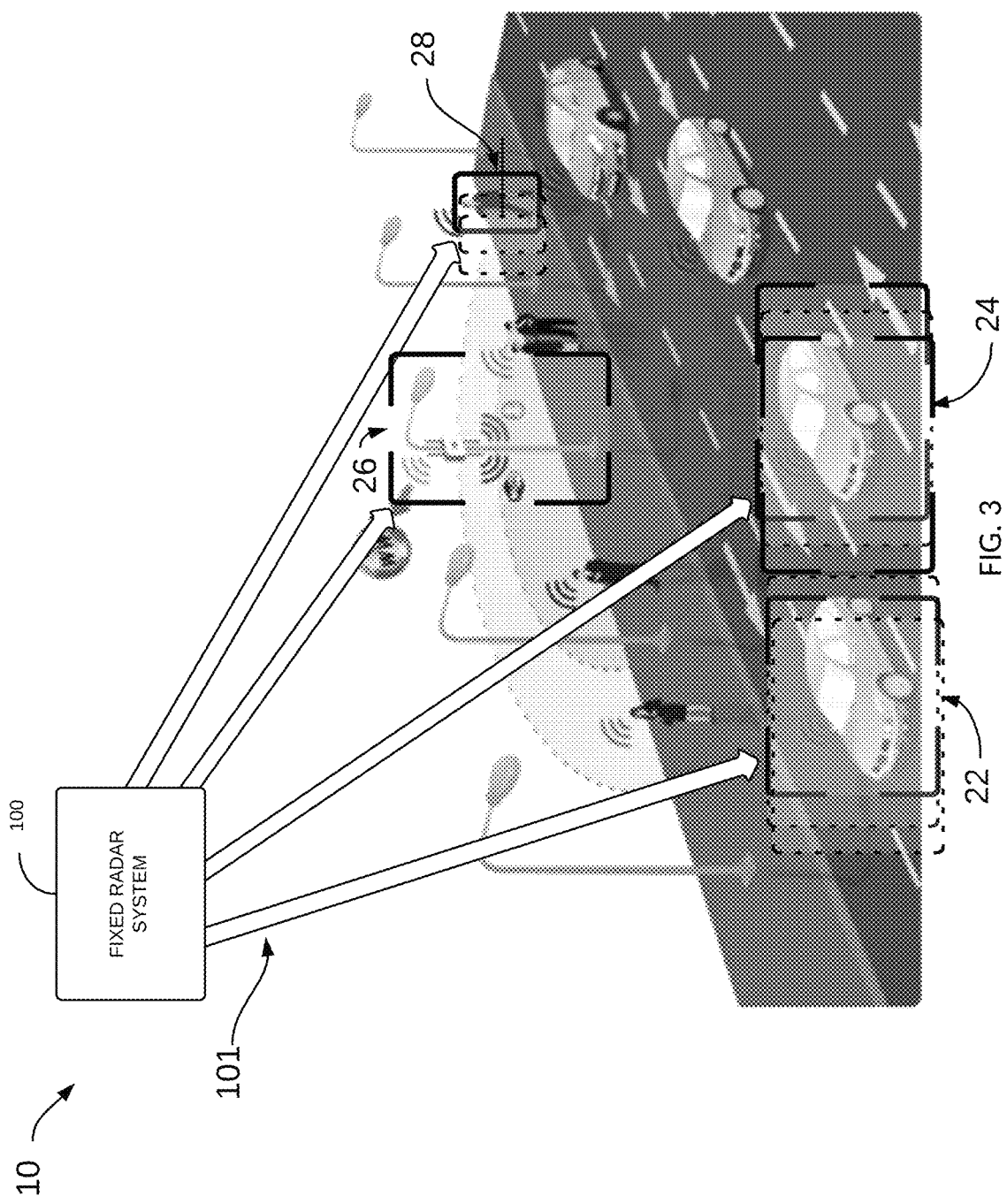
FIG. 3 illustrates operation of a nodal radar system as in FIG. 1, according to embodiments of the present invention.

FIG. 3 illustrates continued operation of the nodal radar system 100 for scans of moving objects. In some embodiments, the nodal radar system 100 uses received radar information to determine a next location of the object and adjusts the scan accordingly. As illustrated, a series of scans 22 are allocated for a vehicle in area 12, a series of scans 24 are allocated for a vehicle in area 14, a single scan 26 is allocated to the stationary street lamp in area 16, and a series of scans 28 are allocated for the pedestrian 18. In this way, the nodal radar antenna system 100 tracks the location and activity of each object.

The nodal radar system 100 may be collocated with a fixed wireless system, wherein the nodal radar system 100 includes object detection capability. While the nodal radar system 100 is able to communicate with other devices and vehicles, it is also able to operate independently. The nodal radar system 100 may act in concert with the fixed wireless system, wherein communications from the nodal radar system 100 are processed through the fixed wireless system. Within the nodal radar system 100 is an object detection module to classify detected objects. This information may also be used to modify behavior of the fixed wireless system, such as to provide non-line of sight signals when there is a large truck or other obstacle to wireless transmission. When such an object is detected, the nodal radar system 100 instructs the fixed wireless system accordingly, and in response the fixed wireless system may initiate actions to avoid the dead spot, such as to use a reflect array or other method to continue coverage.

Figure 4:
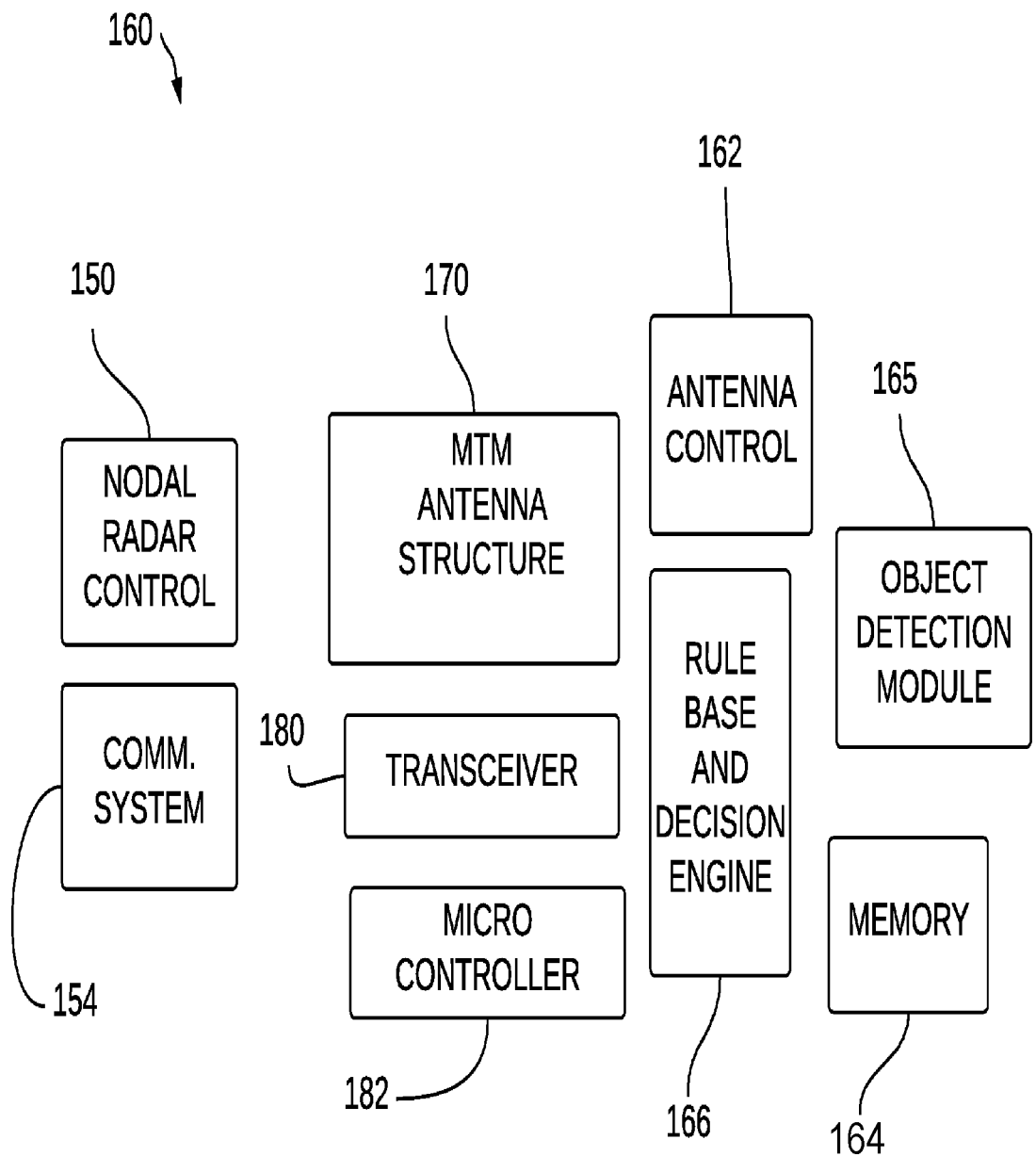
FIG. 4 illustrates a nodal wireless system supporting radar and wireless communications, according to embodiments of the present invention.

FIG. 4 illustrates an embodiment of a nodal wireless system 160 supporting a radar operation and wireless communication operation. A nodal radar control 150 controls the radar operation and works in collaboration with communication system 154. The nodal wireless system 160 includes an MTM antenna structure 170 having a plurality of MTM unit cells having reactance control mechanisms, such as varactors, which are controlled by an antenna control unit 162. The radar and communication operation may be performed by the same MTM antenna structure 170, wherein subarrays are formed for operation. The subarrays may be reconfigured in real time. The nodal wireless system 160 also includes a transceiver 180, a microcontroller 182 and memory 164.

The system 160 may have multiple antenna arrays within MTM antenna structure 170, for radar and communications. These arrays may be divided into transmit and receive arrays or may be duplex-style where an array is used for both transmit and receive. The signals are generated according to the transceiver operation. For operation of the antenna, including beam forming and beam steering, a rule base and decision engine 166 provides guidance. The engine 166 determines when and where to direct the radiation beams and then determines if the decision was optimum. The engine 166 learns from the behavior of the system 160 and trains to improve its decision-making. The object detection module 165 uses radar information to determine if an object is in the area, or field of view, of the radar. The object detection module 165 may also use information from the wireless communication system 154 to identify objects that are causing a dead zone, or to respond to information, such as from a central controller or from a vehicle. The communication system 154 may support vehicle-to-device, or V2X, communications to enhance the radar operations. In this way, the vehicle can probe the system 160 for additional information to better understand the environment and the activity therein.

Figure 5:
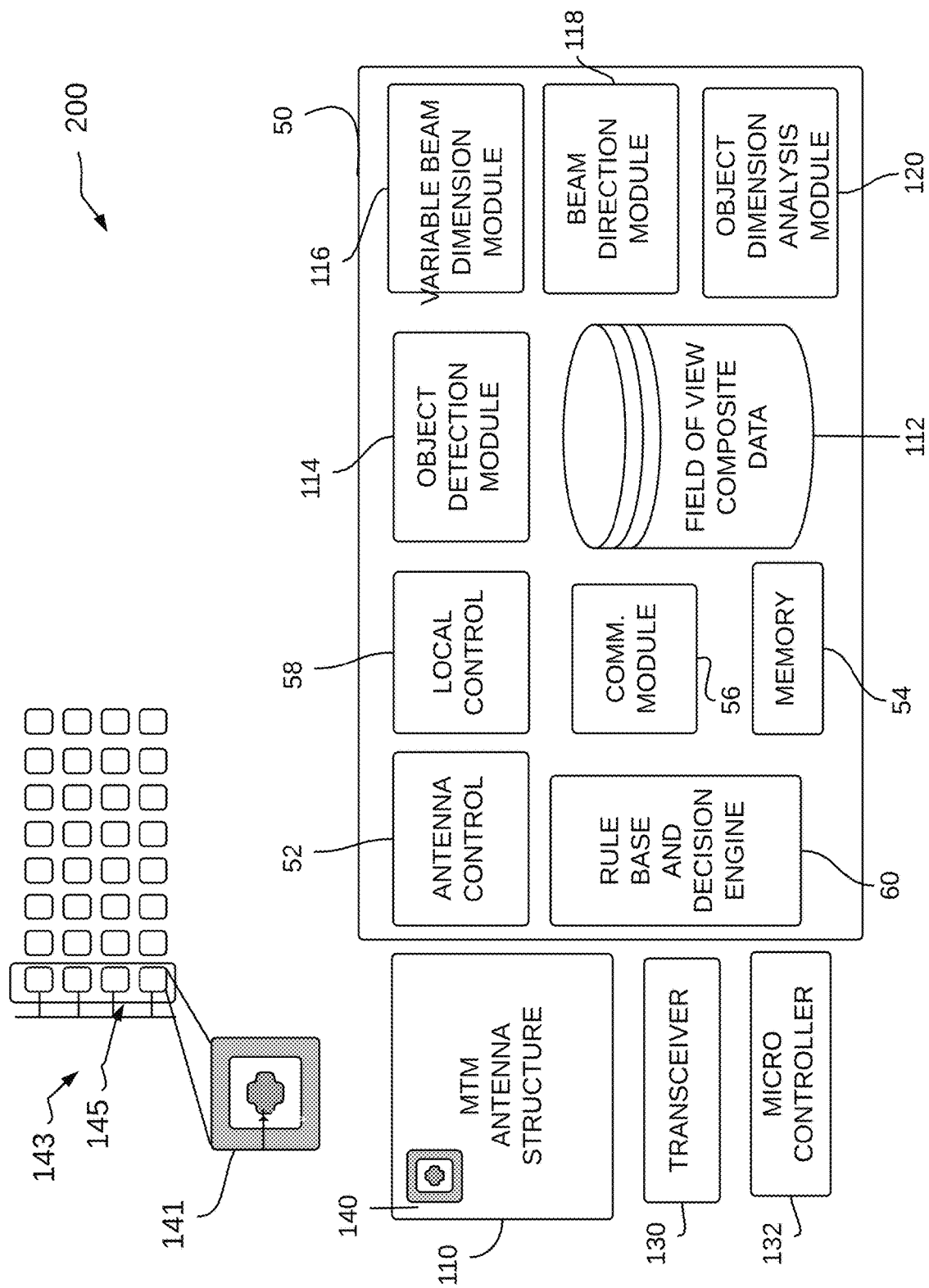
FIG. 5 illustrates a metamaterial antenna system, according to embodiments of the present invention.

FIG. 5 illustrates an antenna system 200 according to various embodiments of the present invention. The system 200 includes an MTM antenna structure 110, which includes multiple MTM unit cells, such as MTM unit cell 140. Each MTM unit cell 140 is an artificially structured element used to control and manipulate physical phenomena, such as electromagnetic (EM) properties of a signal including its amplitude, phase, and wavelength. Metamaterial structures behave as derived from inherent properties of their constituent materials, as well as from the geometrical arrangement of these materials with size and spacing that are much smaller relative to the scale of spatial variation of typical applications. Individual MTM components are considered as unit cells, e.g., MTM unit cell 140. A metamaterial is not a tangible new material, but rather is a geometric design of known materials, such as conductors, that behave in a specific way.

An MTM unit cell, such as cell 140, may be composed of multiple microstrips, gaps, patches, vias, and so forth having a behavior that is the equivalent to a reactance element, such as a combination of series capacitors and shunt inductors. Various configurations, shapes, designs and dimensions are used to implement specific designs and meet specific constraints. In some embodiments, the number of dimensional freedom determines the characteristics of the MTM antenna structure 110, wherein a device having a number of edges and discontinuities may model a specific-type of electrical circuit and behave in a similar manner. In this way, an MTM unit cell radiates according to its configuration and changes to the reactance parameters of the MTM unit cell change its radiation pattern. Where the radiation pattern is changed to achieve a phase change or phase shift, the resultant structure is a powerful antenna or radar, as small changes to the MTM unit cell result in large changes to the beamform.

The MTM antenna structure 110 may be configured as an array of MTM unit cells, a lattice pattern of MTM unit cells, and so forth. These array formations may then be divided into subarrays, which group unit cells together. The subarray may be controlled by a common controller. For example, in the subarray 145 within array 143, the MTM unit cells, such as cell 141, are all controlled by a single voltage. In this way, a same change is made to the reactance of all cells within a subarray 145.

An IAM 50 acts to control the operational parameters of the MTM antenna structure 110. In some embodiments, these parameters include voltages applied to individual MTM unit cells, such as unit cell 140. IAM 50 includes modules and components that capture, measure, store, analyze and provide instructions. The extent of the capabilities of the IAM 50 is strong and flexible; as more and more information is required for an application, the IAM 50 can build additional capabilities. In this way, the IAM 50 is a software programmable module implemented in hardware, having an IAM controller 52 (antenna control 52) that governs actions within the IAM 50. IAM 50 also includes communications module 56 and local control 58, as illustrated in FIG. 5.

In the present embodiment described herein, the application is for an autonomous car, wherein the system 100 is a sensing system that uses radar to identify objects. The use of radar provides a reliable way to detect objects in difficult weather conditions. For example, historically a driver will slow down dramatically in thick fog, as the driving speed decreases with decreases in visibility. On a highway in Europe, for example, where the speed limit is 115 km/h, a driver may need to slow down to 40 km/h when visibility is poor. Using the present embodiment, the driver (or driverless car) may maintain the maximum safe speed without regard to the weather conditions. Even if other drivers slow down, the car enabled with the present embodiment will be able to detect those slow-moving cars and obstacles in the way and avoid/navigate around them.

Additionally, in highly congested areas, it is necessary for an autonomous car to detect objects in sufficient time to react and take action. The present invention increases the sweep time of a radar signal so as to detect any echoes in time to react. Supplemental to the MTM antenna structure 110 is the nodal radar system, such as system 100 of FIG. 1, wherein information captured from another point within the environment assists in the ability of the vehicle's radar to perform and make decisions. In rural areas and other areas with few obstacles during travel, the IAM 50 adjusts the focus of the beam to a larger beam width, thereby enabling a faster scan of areas where there are few echoes. The IAM 50 may detect this situation by evaluating the number of echoes received within a given time period and making beam size adjustments accordingly. Once an object is detected, the IAM 50 determines how to adjust the beam focus. This is achieved by changing the specific configurations and conditions of the MTM antenna structure 110. For example, in one scenario the voltages on the varactors are adjusted. In another scenario, a subset of unit cells is configured as a subarray. This configuration means that this set may be treated as a single unit, and all the varactors are adjusted similarly. In another scenario, the subarray is changed to include a different number of unit cells, where the combination of unit cells in a subarray may be changed dynamically to adjust to conditions and operation of the system.

All of these detection scenarios, analysis and reactions may be stored in the IAM 50 and used for later analysis or simplified reactions. For example, if there is an increase in the echoes received at a given time of day or on a specific highway, that information is fed into the IAM controller 52 to assist in proactive preparation and configuration of the MTM antenna structure 110. Additionally, there may be some subarray combinations that perform better, such as to achieve a desired result, and this is stored in the IAM memory 54.

In operation, the MTM antenna structure 110 provides radar radiation pattern(s) to scan the FoV of the system 100. In some embodiments, an FoV composite data unit 112 stores information that describes the FoV. This may be historical data used to track trends and anticipate behaviors and traffic conditions or may be instantaneous or real time data that describes the FoV at a moment in time or over a window in time. The ability to store this data enables the IAM 50 to make decisions that are strategically targeted at a particular point or area within the FoV. For example, the FoV may be clear (no echoes received) for five minutes, and then one echo arrives from a specific region in the FoV; this is similar to detecting the front of a car. In response, the IAM 50 may determine to narrow the beam width for a more focused view of that sector or area in the FoV. The next scan may indicate the objects' length or other dimension, and if the object is a car, the IAM 50 may consider what direction the object is moving and focus the beams on that area. Similarly, the echo may be from a spurious object, such as a bird, which is small and moving quickly out of the path of the car. There are a variety of other uses for the FoV composite data 112, including the ability to identify a specific type of object based on previous detection.

The object detection module 114 receives control information from the IAM controller 52, and determines the adjustments, if any, to be made. In some embodiments, the scan begins with a coarse scan having a large bandwidth. On object detection, the beam width narrows. The variable beam dimension module 116 responds to the object detection module 114 and may vary the beam width as quickly or slowly as desired. In some embodiments, the beam width is a binary value, and in others it may take on continuous values. The object detection module 114 instructs the beam direction module 118 where to direct the beam, such as from a subarray. From the received information (echoes) the object dimension analysis module 120 determines parameters and dimensions of the detected object.

Object detection may be enhanced with object classification to identify the type of object and its activity parameters. For example, a deep learning system may be incorporated into the object detection module 114 to identify a person from a car, and to identify the velocity of that object. Such systems train on labelled data and actual radar signals after which they are able to perceive objects with a high probability of certainty. Such object classification systems and capabilities may be additional to the rule base and decision engine 60.

Continuing with system 100, the transceiver 130 is controlled by controller 132 and controls the transmit and receive paths to and from MTM antenna structure 110. There may a portion of the unit cells, such as unit cell 140, that is dedicated to receive, and another portion that is dedicated to transmit, or the MTM antenna structure 110 may be a transmit and receive antenna. In some embodiments, the IAM 50 may allocate specific unit cells, or subarrays, as receive only, transmit only or as transmit and receive. There are any number of combinations and designs for these embodiments.

Figure 7:
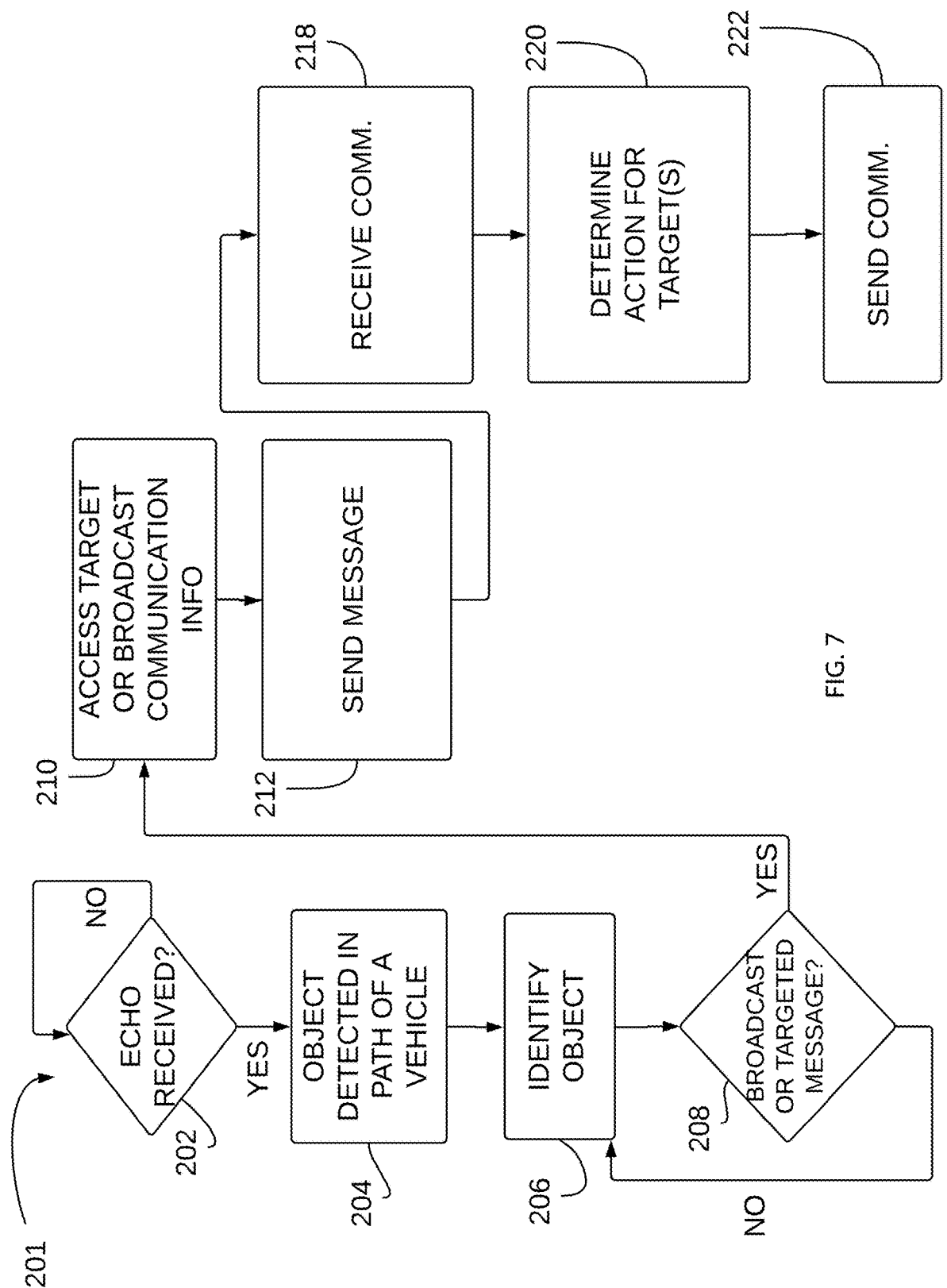
FIG. 7 illustrates a process for operation of a metamaterial antenna system, according to embodiments of the present invention.

There are many methods that systems that the MTM antenna structure 110 may use with respect to the IAM 50 for applying, embedding, controlling and so forth. An embodiment for dynamic control of the MTM antenna structure 110 is illustrated in FIG. 7.

Figure 6:
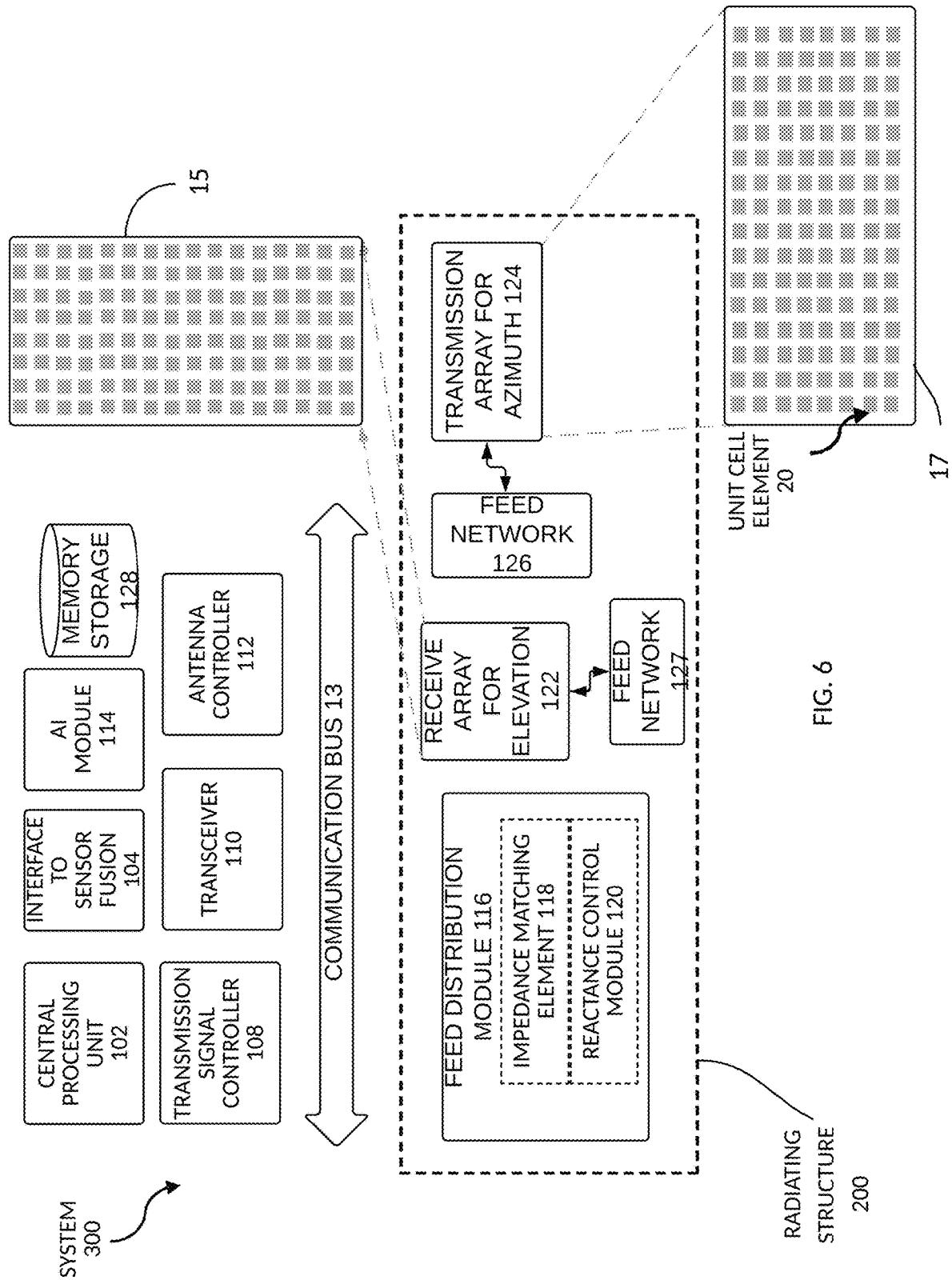
FIG. 6 illustrates a metamaterial antenna system, according to embodiments of the present invention.

FIG. 6 illustrates another embodiment of an antenna system 300, such as used in a radar system, having a radiating array structure 200 coupled to an antenna controller 112, a central processor 102, and a transceiver 110. A transmission signal controller 108 generates the specific transmission signal, such as frequency modulated continuous wave (FMCW), which is used for radar sensor applications as the transmitted signal is modulated in frequency, or phase. The FMCW signal enables radar to measure range to an object by measuring the differences in phase or frequency between the transmitted signal and the received signal, or reflected signal. Other modulation types may be incorporated according to the desired information and specifications of a system and application. Within FMCW formats, there are a variety of modulation patterns that may be used within FMCW, including triangular, sawtooth, rectangular and so forth, each having advantages and purposes. For example, sawtooth modulation may be used for large distances to a target; a triangular modulation enables use of the Doppler frequency, and so forth. The received information is stored in a memory storage unit 128, wherein the information structure may be determined by the type of transmission and modulation pattern.

The transmission signal controller 108 may generate a cellular modulated signal, such as an orthogonal frequency division multiplexing (OFDM) signal. The transmission feed structure may be used in a variety of systems. In some systems, the signal is provided to the system 100 and the transmission signal controller 108 may act as an interface, translator or modulation controller, or otherwise as required for the signal to propagate through a transmission line system.

The present invention is described with respect to a radar system, where the radiating structure 200 is a transmission array-fed radiating array, where the signal radiates through slots in the transmission array to the radiating array of MTM elements that radiate a directional signal. Continuing with FIG. 6, the radiating structure 200 includes individual elements, having an impedance matching element 118 and a reactance control element 120.

In some embodiments a reactance control element includes a capacitance control mechanism controlled by antenna controller 112, which may be used to control the phase of a radiating signal from radiating array structures, transmission array structure for elevation 122 and transmission array structure for azimuth 124. In operation, the antenna controller 112 receives information from other modules in system 300 indicating a next radiation beam, wherein a radiation beam may be specified by parameters such as beam width, transmit angle, transmit direction and so forth. The antenna controller 112 determines a voltage matrix to apply to the reactance control mechanisms coupled to the radiating structure to achieve a given phase shift or other parameters. In these embodiments, the radiating array structure 200 is adapted to transmit a directional beam without using digital beam forming methods, but rather through active control of the reactance parameters of the individual elements that make up the array. Transceiver 110 prepares a signal for transmission, such as a signal for a radar device, wherein the signal is defined by modulation and frequency. The signal is received by each element of the radiating structure 200 and the phase of the radiating array structure 200 is adjusted by the antenna controller 112. In some embodiments, transmission signals are received by a portion, or subarray, of the radiating array structure 200. These radiating array structures are applicable to many applications, including radar and cellular antennas. The present embodiments consider application in autonomous vehicles as a sensor to detect objects in the environment of the car. Alternate embodiments may use the present inventions for wireless communications, medical equipment, sensing, monitoring, and so forth. Each application type incorporates designs and configurations of the elements, structures and modules described herein to accommodate their needs and goals.

In system 300, a signal is specified by antenna controller 112, which may be in response to Artificial Intelligence (AI) module 114 from previous signals, or may be from the interface to sensor fusion 104, or may be based on program information from memory storage 128. There are a variety of considerations to determine the beam formation, wherein this information is provided to antenna controller 112 to configure the various elements of arrays 122, 124, which are described herein. The transmission signal controller 108 generates the transmission signal and provides same to feed distribution module 116, which provides the signal to feed structure 126 and transmission arrays 122, 124.

As illustrated, radiating structure 200 includes the transmission arrays 122, 124, composed of individual radiating elements discussed herein. The transmission arrays 122, 124 may take a variety of forms and are designed to operate in coordination with the feed distribution module 116, wherein individual radiating elements 20 correspond to elements within the transmission arrays 122, 124. As illustrated, each of the transmission arrays 122, 124 is an 8×16 array of unit cell elements 20, wherein each of the unit cell elements 20 has a uniform size and shape; however, some embodiments incorporate different sizes, shapes, configurations and array sizes. When a transmission signal is provided to the radiating structure 200, such as through a coaxial cable or other connector, the signal propagates through the feed distribution module 116 to the transmission arrays 122, 124 for transmission through the air.

The impedance matching element 118 and the reactance control element 120 may be positioned within the architecture of feed distribution module 116; one or both may be external to the feed distribution module 116 for manufacture or composition as an antenna or radar module. The impedance matching element 118 works in coordination with the reactance control element 120 to provide phase shifting of the radiating signal(s) from transmission arrays 122, 124. The present invention is a dramatic contrast to the traditional complex systems incorporating multiple antennas controlled by digital beam forming. The present invention increases the speed and flexibility of conventional systems, while reducing their footprint and expanding performance.

As illustrated, there are multiple arrays for transmission, where at least one of the arrays is for transmission in the azimuth, or horizontal, direction, e.g., transmission array structure for azimuth 124, and the other is for receiving signal over the elevation of the array, e.g., receive array for elevation 122. The two antenna arrays share a common feed 126, but have orthogonal radiation beams. The two antenna arrays may also use separate feeds if desired.

As illustrated in FIG. 7, the process 201 begins by system 200 of FIG. 5 determining if an echo is received by the MTM antenna structure 110, step 202. If so, system 200 extracts the FoV parameters, 204, and determines if an object is detected in the path of a vehicle; else the system 200 continues to transmit beams and listen for echoes. The FoV parameters may include the range from the system 200 to the detected object, the speed of the object, the size of the object and so forth, in addition to the direction of arrival of the signals reflected by the object. In the present embodiment, the IAM 50 identifies the object, 206, and may narrow the focus of the transmission beam, and then checks to see if a communication is to be sent to a target vehicle or broadcast to multiple vehicles, 208. In the present embodiments, process 201 interfaces with a variety of other systems within an application. For example, in a vehicular application, information received at the antenna and the analysis of at least a portion of that data are provided to other modules for processing, such as to a perception layer in an automobile or to a navigation screen.

The system 200 then accesses the target or broadcast communication information, 210, and sends the message, 212. The message is to identify a detected object and assist in vehicle driver assist or autonomous driving. The message may be a simple identification of a location of an object, or may be detailed information about the object and its velocity/acceleration/potential movement. The information may also be to provide an instruction as to how to circumnavigate and avoid a collision, as the nodal radar may see areas in the environment that enable a quick escape route. The system 200 may also receive a communication from the vehicle or other device within the environment, 218. The received communication may be from another nodal radar system or may be from a wireless communication system. The system 200 then determines an action for the target, 220, based on the received communication, such as to provide an indication of the capabilities of the vehicle and so forth. The communication from the vehicle may be from a rule base or decision engine that provides a preferred action. The system 200 may then continue to communicate with the target vehicle, 222 or multiple vehicles/devices.

Figure 8:
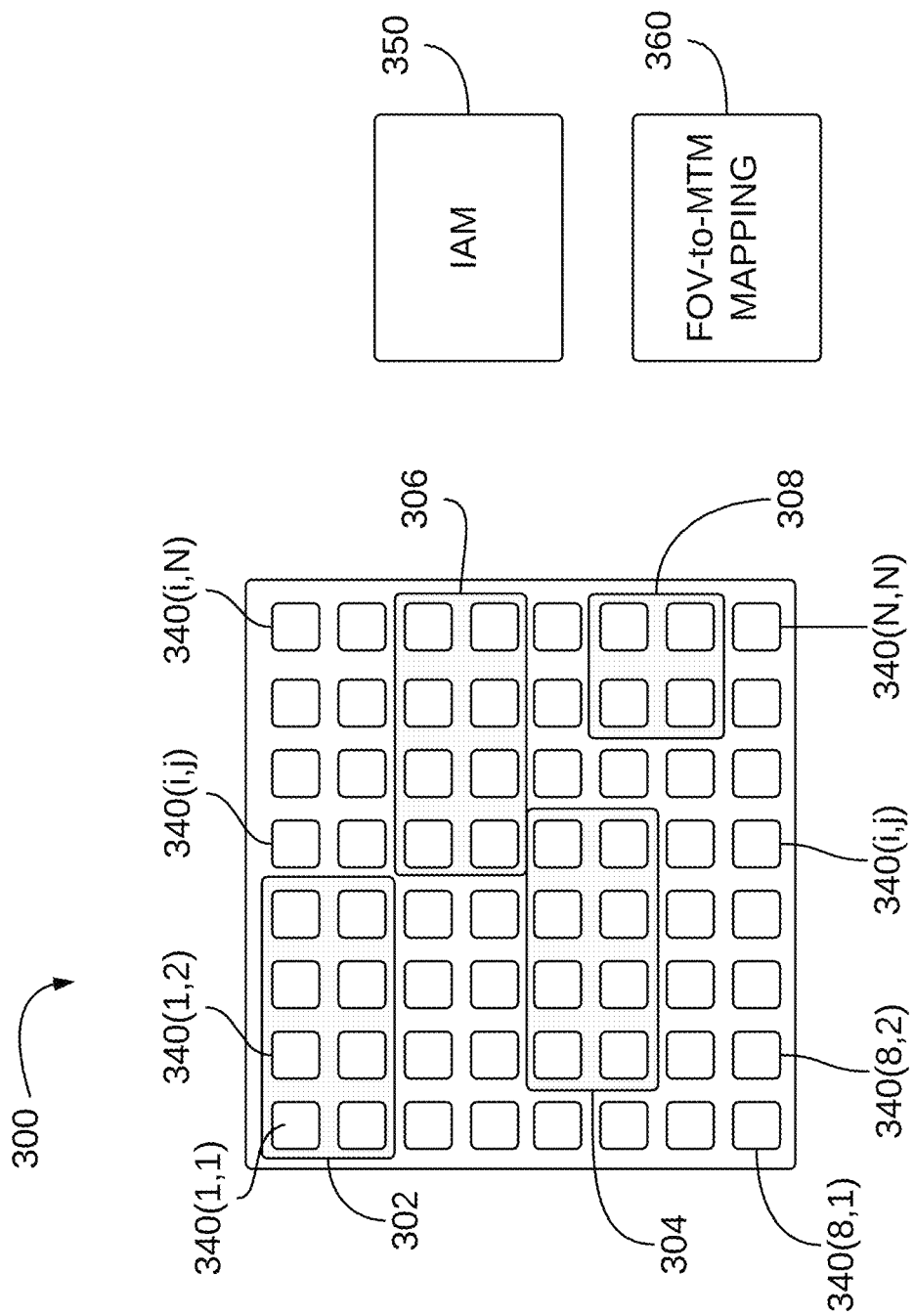
FIG. 8 illustrates a metamaterial (MTM) antenna structure, according to embodiments of the present invention.

FIG. 8 illustrates a metamaterial (MTM) antenna structure 300 (or a portion of a structure) having a plurality of MTM cells arranged in an array of N×N unit cells, wherein for clarity and discussion herein each unit cell is identified by a row, column index (i,j). The array can be an asymmetric N×M array as well. For simplicity, a symmetric N×N case is described. For example, from the viewer's perspective, the unit cell in the upper corner is identified as 340(1,1); and the unit cell in the bottom right is identified as 340(N,N). Other configurations are possible based on the application, structure, physics and goals of the antenna structure, such as structure 300. Antenna structure 300 is part of an antenna system, that includes other modules, some of which are not shown in this drawing. Similarly, the specific shape of the unit cells may take on any of a variety of shapes that result in the characteristics and behavior of metamaterials and are not restricted to square or rectangular or any other regular shape.

Each of the unit cells 340(i,j) in the antenna structure 300 may operate individually or as part of a subarray. As illustrated, the IAM 350 has associated or grouped specific unit cells into sub-arrays 302, 304, 306 and 308. The IAM 350 determines where the radiated beam is to be directed, the shape of the beam and the dimensions of the beam. The beam may be a coarse or large bandwidth beam, a midsized beam or a small, narrow bandwidth beam depending on the situation, the object detected and the timing of the detection, as well as other considerations. The IAM 350 may preconfigure one or more of the subarrays to anticipate a next action, or may use a default configuration, such as to start with a broad bandwidth which enables a faster scan capability or sweep time. For each sweep, the FoV is divided into portions, which may have consistent dimensions, different dimensions or may be dynamically adjusted. In some embodiments, the IAM selects specific directions to have a narrow beam, such as directly in front of the vehicle; other directions, such as on the edges of the FoV may be scanned with a wide beam. These and other design considerations are made by the designer in setting up the IAM 350, wherein some IAM 350 are flexible and configurable. In the illustrated example, the MTM antenna structure 300 has several subarrays that are intended to direct the beam and form the desired radiation pattern.

Once an object is detected, the FoV-to-MTM mapping 360 identifies the portion of the FoV for the IAM 350 and maps that location to a specific MTM unit cell or subarray that will focus on and capture more information about the object. In some embodiments, the IAM 350 has access to various scenarios and may use detected information to predict future conditions on the road. For example, if the MTM antenna structure 300 detects a deer running across the road in an area having a known deer path, the IAM 350 may predict the direction of the deer, as well as anticipate other deer that may follow. The radiation beams from antenna structure 300 may sweep across the FoV, wherein the visual field of view and the antenna field of view are not necessarily the same. In this case, the antenna FoV may be a 2-D view, whereas objects are typically 3-D. Various systems and configurations enable 3-D object detection and classification through placement of transmit and receive antenna arrays and or combinations of multiple transmit to multiple receive structures.

Figure 9:
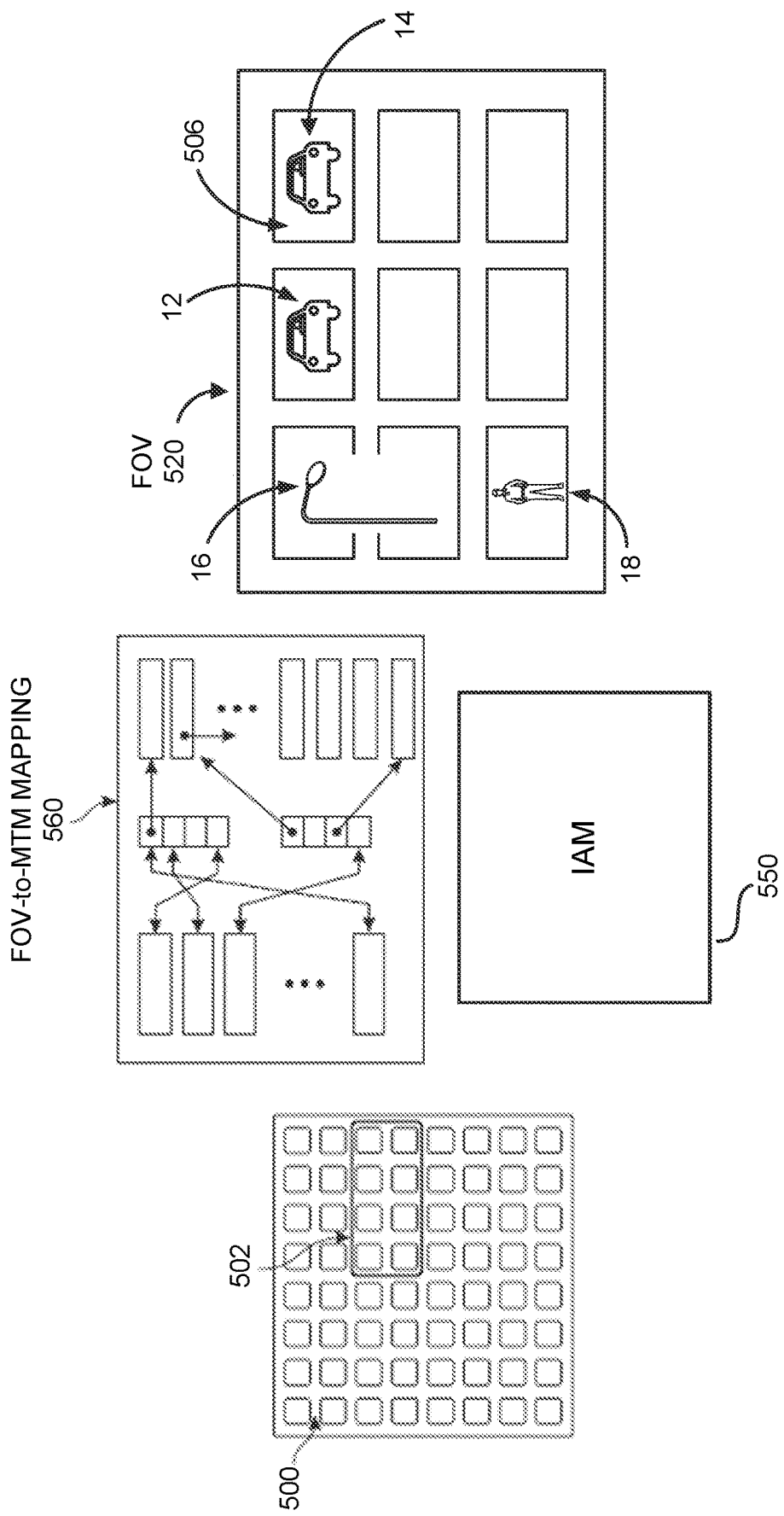
FIG. 9 illustrates a mapping of a metamaterial antenna structure to locations in a field of view, according to embodiments of the present invention.

FIG. 9 illustrates an MTM antenna structure 500 having at least one sub-array 502 activated to generate beams to capture a specific area or FoV 520, corresponding to the system 10 of FIG. 1. When the car 14 is detected within an area 506, the IAM 550 identifies the associated portion 506 of the FoV 520. This is mapped to the portion of the MTM antenna structure 500 that will generate a focused beam in that area; and that portion is sub-array 502. Similarly, car 12 is also identified within FoV 520 in another area; street lamp 16 and person 18 are also located within FoV 520. The system 100 has a mapping from the FoV to the MTM array 560, which may be configured as a Look Up Table (LUT), as a formula, or as another mapping format that configures subarrays of the MTM array 500 to generate a beam toward individual portions of the FoV 520. In this way, there is low latency dynamic adjustment of the radiation beam for beam forming and beam steering. The ability to capture multiple objects with a single subarray acts to further reduce the delay in detection and communication, reducing the time from detection to action.

As illustrated in FIG. 9, the mapping between the MTM antenna structure 500 and the FoV 520 is provided by FoV-to-MTM mapping unit 560, which includes various entries for such correlation. This type of mapping format may be dynamically adjusted to keep pace with the movement of vehicles; in addition, this information may be stored in a relational database or other device to assist the IAM 550 in learning and improving over time. In this way the IAM 550 may use artificial intelligence (AI), an expert system, a neural network, or other technology to improve performance of the system for object detection.

As a vehicle travels, there are different FoV snapshots or slices, such as from a near-field to a far-field slice. From the perspective of a vehicle there is a near-field FoV, a far-field FoV, and several mid-field FoVs, which may each be considered as a slice of information. The information may be stored according to angle of arrival, range to the target, velocity of the target, Doppler information from the received signal and so forth. In one embodiment, these are referred to as range-Doppler maps. Each slice corresponds to an instant in time as the car travels. The IAM 550 determines which type of beam is broadcast for each FoV as a function of many parameters, including, for example, the speed of the car and the speed of a detected object in relation to the car. The IAM 550 may determine that for specific conditions, the beams are meant to reach a specific FoV, such as where the car is moving slowly, the FoV 520 may be sufficient, but if the car is moving rapidly then there is a desire to reach more than just the FoV 520. Weather conditions will have an impact as well, such that if the car will take longer to react, stop or otherwise change the current driving conditions, then the IAM 550 may desire to reach the longest FoV to allow the car time to react. This may be utilized for snow or icy conditions, which dramatically impact how quickly a car may decelerate and/or halt.

In some embodiments, a nodal radar system may be positioned on a bill board placed along the road to detect objects traveling along the road. The bill board may have lighting, switched effects, messaging or other power-supplied effects. For power efficiency, the bill board is able to change to a static message that does not use these effects. In some embodiments, the bill board will be able to detect the type of vehicles traveling on a crowded highway and then post an ad that those drivers would like. For example, if there is a faster way to travel for electric vehicles, a bill board may detect times when that lane is empty or sparsely used, while the other lanes are jammed In this case, the bill board may want to advertise electric vehicles. This ability for infrastructure, such as a stationery bill board, to understand what is happening in its vicinity may be enhanced by communicating with specific vehicles or broadcasting a message to all the vehicles. A communicative billboard may detect a specific driver via wireless signals with the car and may communicate via WiFi, Bluetooth, cellular or other communication method. Using an MTM antenna structure, these billboards are able to understand more about their environment.

A nodal radar may communicate with vehicles, buildings and other devices through a variety of communication protocols. As discussed above, WiFi and so forth may be used. In some embodiments, the radar provides a messaging protocol that is received at the vehicle, such as to direct a radiation beam to a specific target area of the vehicle. Such messaging may be used to initiate a communication or may be used to send a specific message, similar to Morse code or other coded signaling. The signaling may be made to a portion of a vehicle bumper, a metallic or reflective sticker on a vehicle, a mirror, headlamp and so forth.

There may be other sensors that work in collaboration with MTM antenna structures, where each has a special area of detection. In some embodiments a nodal radar system operates in coordination with other sensors, such as a camera sensor, infrastructure sensors, a laser or lidar sensor, vehicle operational sensors, user preference sensors, environmental sensors, a wireless communication module signal and so forth. In a vehicle these various sensors are combined and interpreted through a sensor fusion module that controls coordination of the information from sensors. An IAM may be designed to interface with a sensor fusion module. The camera, or visual, sensor is adapted for capture of objects, environments, and other elements in the FoV of the sensor. The laser sensor acts to identify objects, but its performance deteriorates with distance, weather and light inhibiting conditions. The addition of the MTM antenna sensor provides robust, consistent information when the other types of sensors do not.

Some other considerations for antenna applications, such as for radar antennas used in vehicles, include the antenna design, capabilities, and receiver and transmitter configurations. A typical electronic system with an antenna array consists of two or more antenna elements, beam forming network, and a receiver or transmitter. The beamforming network may consist of a Butler matrix or other antenna arrays combined with phase shifting elements. Many different antenna configurations can be utilized as an antenna element in the antenna array: simple dipole, monopole, printed patch design, Yagi antenna, and so forth. One of the primary goals for antennas mounted on/in the car is to achieve a compact and aesthetic design. Other goals relate to the type of communication signal used for the radar beam. One type of modulation used is Frequency Modulation Continuous Wave (FMCW), which is effective in radar applications, as radar does not need to pulse, but rather transmits continuously. FMCW is a continuous carrier modulated waveform that is transmitted as a continuous periodic function, such as sinusoid, sawtooth, triangular and so forth. The sweep time, or sweep period, T., is the time for transmission of one period of the waveform. The signal transmitted during one sweep period is referred to as a chirp. There is a difference in the frequency of the transmit and receive signals that is referred to as the beat frequency, $b_r$. The range of the antenna, R, is the distance from the antenna to a detected object, and is a function of the sweep period, beat frequency, the speed of light, c, and the sweep bandwidth, $B_r$. A moving target induces a Doppler frequency shift that enables radar to detect the relative velocity of the target with respect to the antenna. The phase difference between the transmit and receive signals provides location information, while the frequency shift identifies a speed.

In the case of moving objects, the signal phase distortions may impact the performance of the antenna array. One way to offset such distortion is to use multiple subarrays at the Tx and Rx sides to filter out these impurities. Another way is to adjust the antenna calibration on-the-fly to reduce the phase distortion of moving objects.

Traditional phase shifting is used to control the beam of an antenna. Phased array antennas have multiple elements that are fed so as to have a variable phase or time-delay at each element and so that the beam scans from different angles. The multiple elements provide radiation patterns with lower sidelobes and enables careful beam shaping. The beam can be repositioned for more directed and efficient operation.

The present inventions provide an MTM antenna structure that provides phase shifting without the active elements required to change the phase, or in the traditional ways. The MTM antenna structures of various embodiments use the characteristics of the metamaterial shape and configuration to provide phase shift without the use of mechanical or electrical phase shifters.

Figure 10:
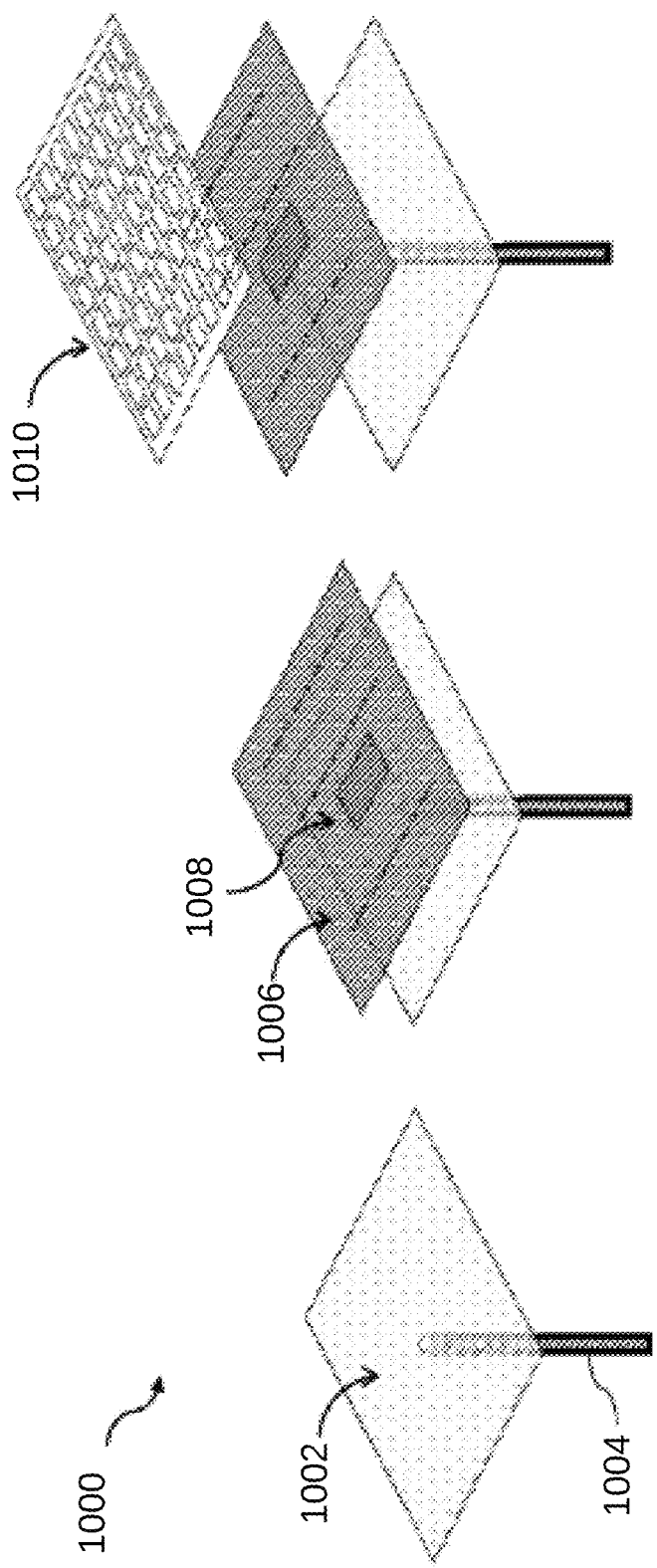
FIGS. 10 and 11 illustrate probe-fed metamaterial antenna structures, according to embodiments of the present invention.

The MTM antenna arrays of the present invention may be fed by a variety of configurations, such as a probe feed or a substrate integrated waveguide and so forth. In one example of an MTM antenna structure 1000, illustrated in FIG. 10, a signal source is provided as a probe 1004, which may be coupled to a ground plane 1002. The probe 1004 supplies the source signal for the antenna 1000 to generate a modulated EM waveform. A second layer 1006 is positioned over the ground plane 1002. The second layer 1006 is made of a dielectric material and has an antenna structure 1008 configured thereon. This antenna 1008 is designed to receive the source signal and generate a relatively flat wave front to meet the MTM layer 1010. The antenna 1008 may be a dipole antenna or any other antenna capable of generating a relatively uniform and flat wave front across the entirety of the second layer 1006. The ability to provide the signal to the MTM array or to individual subarrays and/or individual unit cells, enables the MTM antenna 1000 to radiate EM beamforms that are steerable. The MTM unit cells are controlled by changes to the reactance behavior of the MTM unit cells, such as through a variable capacitor or varactor coupled between the MTM structures.

Figure 11:
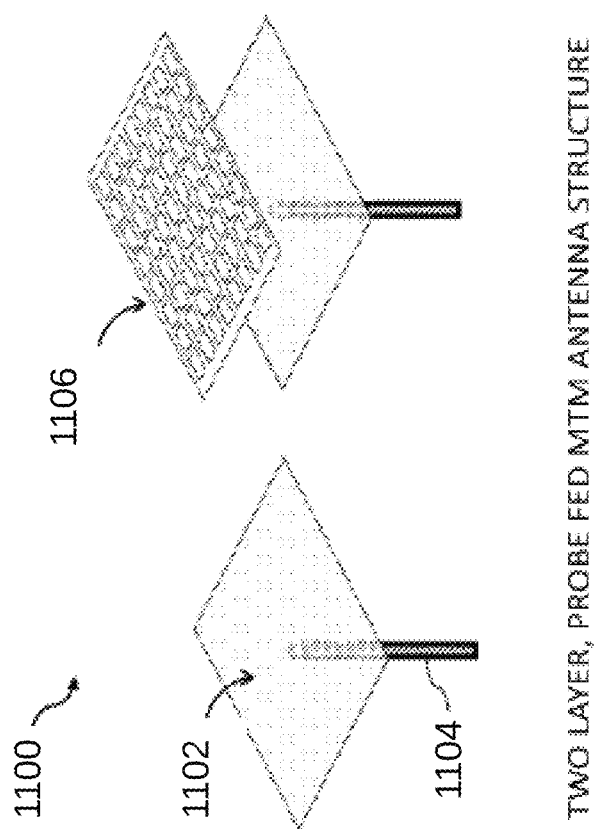

Another embodiment is illustrated in FIG. 11, which is a two-layer, probe fed MTM antenna structure 1100. As in the example of FIG. 10, a probe 1104 supplies the signal to a ground plane layer 1102. In this embodiment, an MTM antenna structure 1106 is placed over the ground plane with no middle layer. The source signal is distributed across the ground plane 1102 such that a relatively flat wave form is presented to the MTM antenna structure 1106. The MTM antenna structure 1106 then radiates the transmission signal as described herein, wherein each unit cell may transmit individually or transmit as a sub-array.

Figure 12:
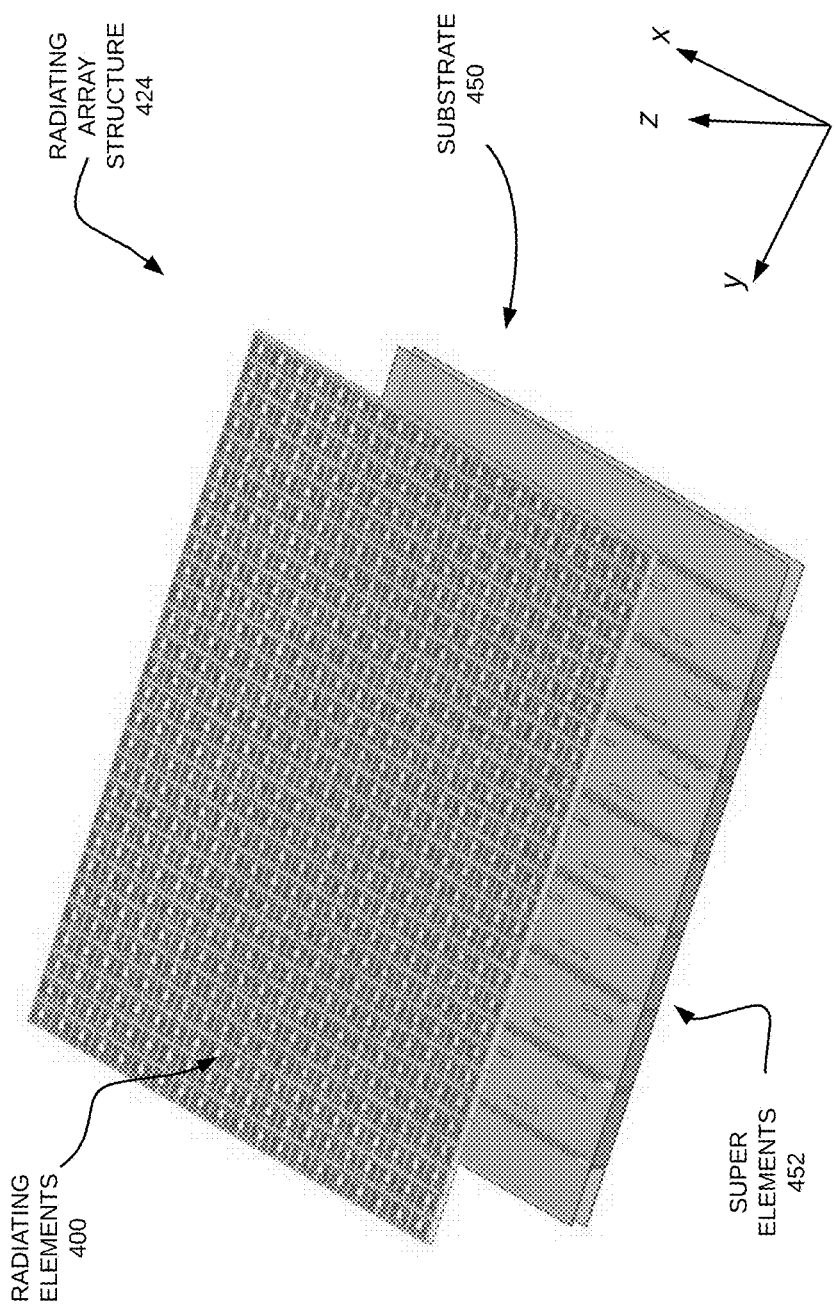
FIG. 12 illustrates an embodiment of an MTM antenna configuration, according to embodiments of the present invention.

Current technology presents a variety of sensors, such as for an automobile that may include various camera, laser, radar, temperature and other sensors. As shown in FIG. 12, a sensor fusion controller 1210 coordinates and controls operations of the various sensors within the system 1200. An MTM antenna sensor 1202 provides information on objects detected in the automobile's path and may provide pre-information to other sensors that have not yet triggered or detected. This information may assist other modules and controllers within the automobile to prepare for an action. This effectively pre-configures the automobile by the sensor fusion controller 1210.

FIG. 12 illustrates an embodiment of an MTM antenna having radiating elements 400, which are each MTM unit cells. The radiating array structure 424 of MTM elements 400 may operate as a single array or may be controlled to operate as multiple subarrays, wherein each of the array or subarrays acts to generate a radiation beamform that is steerable through control of the reactance of individual MTM unit cells. The feed structure for the radiating array structure 424 is a substrate 450 having multiple conductive layers and a dielectric layer sandwiched therebetween. The feed is configured as super elements 452 that are along the x-direction of the radiating array structure 424, wherein each super element includes a plurality of slots or discontinuities in the conductive layer proximate the radiating array structure 424. A signal is provided to each of the super elements 452 that radiates through the slots in the super elements and feeds the radiating array structure 424. The various super elements 452 may be fed with signals of different phase, thus providing phase shifting in the y-direction, while the radiating array structure 424 may be controlled so as to shift the phase of the transmission in the y-direction and/or the x-direction, wherein the signal transmits in the z-direction.

The ability to control the directivity and phase of the transmission provides flexibility and responsive behavior for wireless communications and radar applications. The radiating array structure 424 may be positioned within an infrastructure point within an environment, such as a street lamp, building, road sign, billboard, and the like. In this way, the radiating array structure 424 may scan the environment with predetermined knowledge of the area, such as road dimensions, side walk dimensions, traffic signal locations, cross-walk dimensions and so forth. The radiating array structure 424 may be part of a sensor fusion within the infrastructure whereby different locations share information and communicate with each other to provide information ahead of action, such as to identify a speeding car several blocks before it actually is in range of a given sensor. In this way, one or multiple sensors may provide alerts to other sensors in the environment to be on the lookout for a speeder. The dimensions and size provided in the drawings given in these descriptions is not meant to be limiting, but rather are provided for clarity of understanding of the reader.

Figure 13:
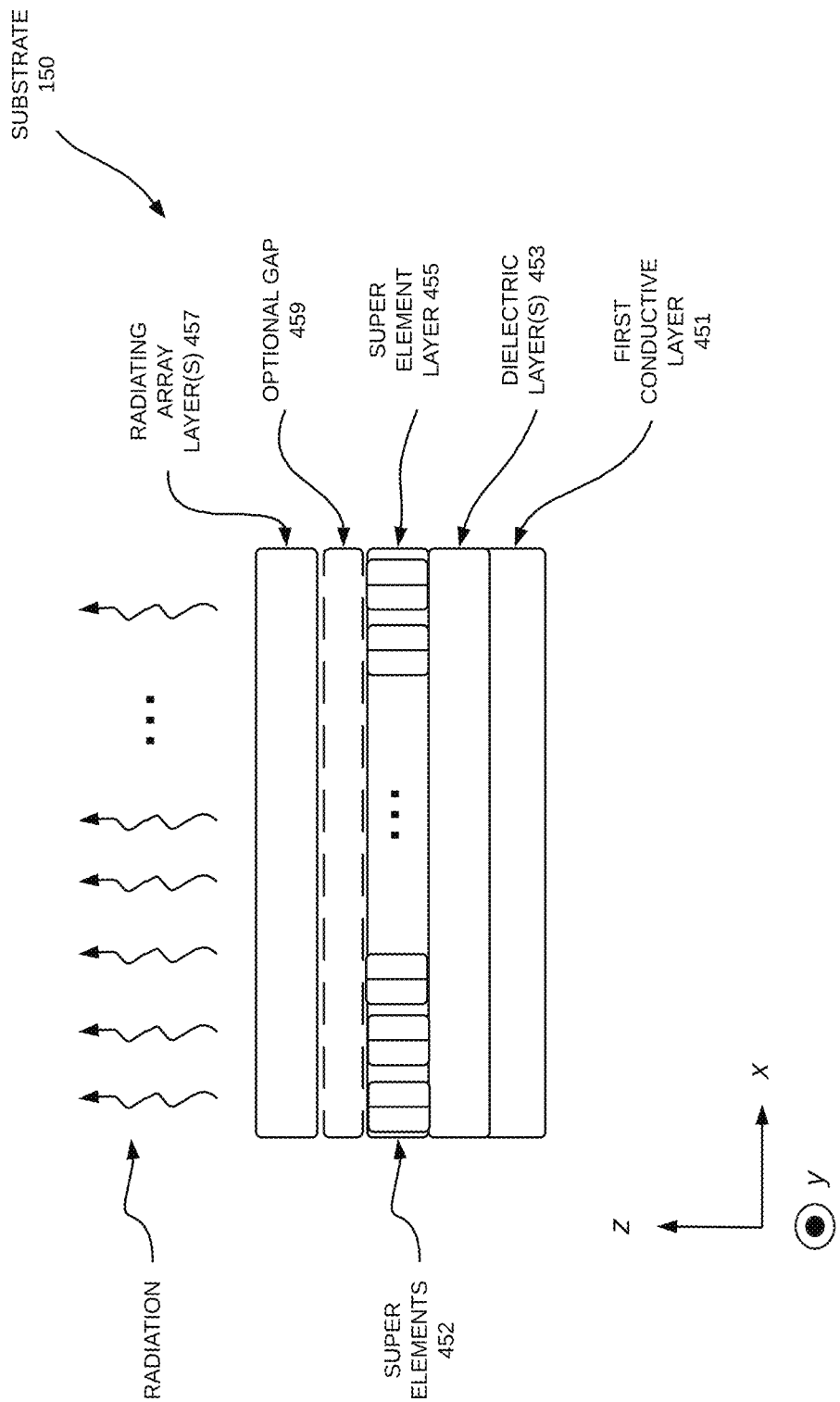
FIG. 13 illustrates a perspective view of the MTM antenna configuration as in FIG. 12, according to embodiments of the present invention.

FIG. 13 is another perspective of the radiating array structure 424 illustrating the various layers forming the device. The substrate includes a first conductive layer 451, a dielectric layer(s) 453, and a super element layer 455. The super elements are formed by conductive and non-conductive traces on a top portion of the super element layer 455 and by vias formed through the super element layer 455 and through the dielectric layer(s) 453. The vias (not shown) are lined with conductive material, or may be filled with conductive material, so as to form channels defining the super elements 452 in super element layer 455 and provide a wave guide function to maintain propagation of the signals fed into the super elements 452. The longitudinal direction of the super elements 452 in the perspective of FIG. 13 is illustrated in the y-direction. The signal radiates in the z-direction. Again, note these directions are for explanation purposes only and do not necessarily correlate to absolute horizontal of vertical references.

Figure 14:
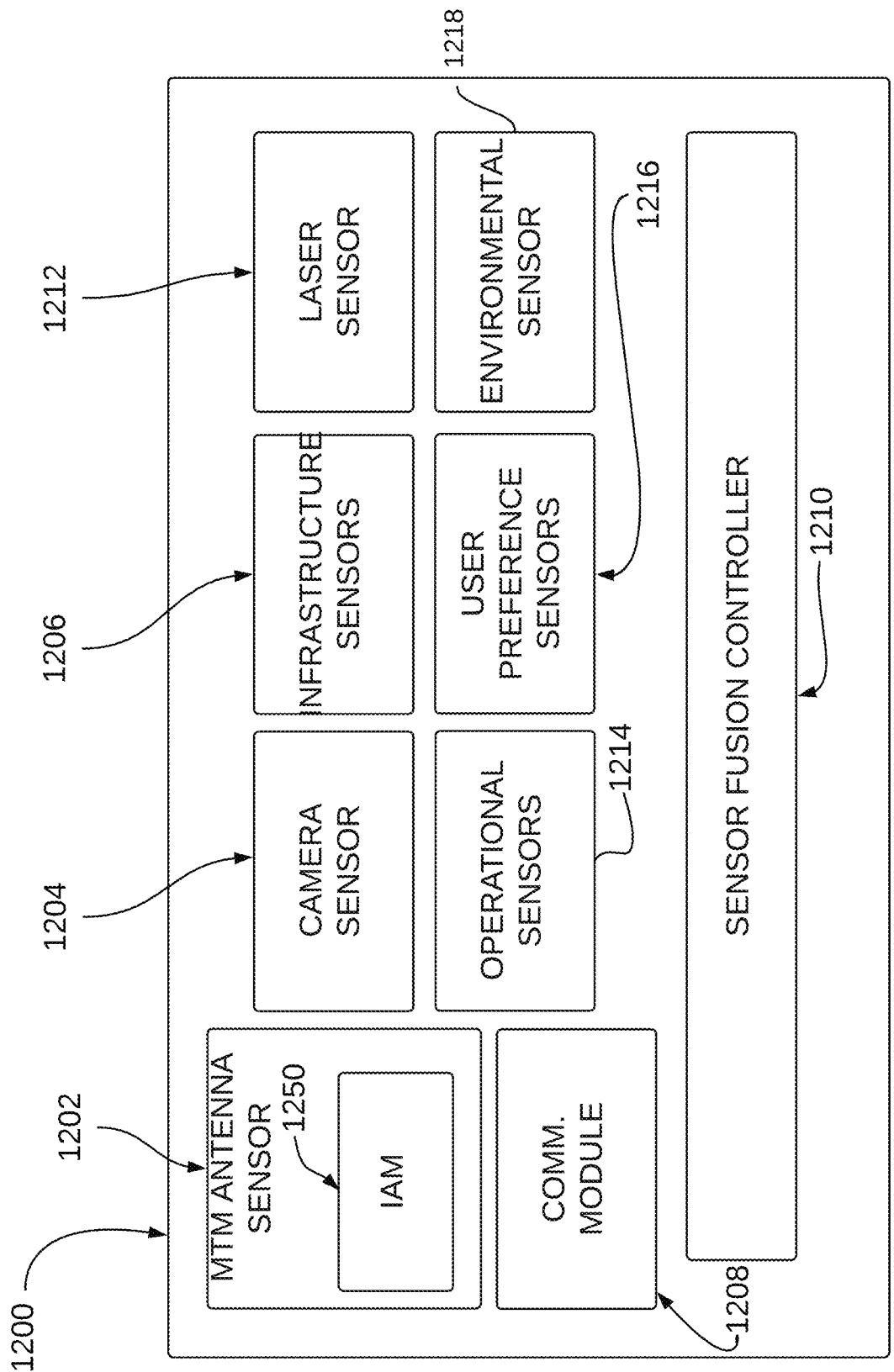
FIG. 14 illustrates a sensor fusion system, according to embodiments of the present invention.

FIG. 14 illustrates a sensor fusion according to embodiments of the present invention. As illustrated, the system 1200 includes a camera sensor 1204 which will detect visible objects and conditions and is used in rear view cameras that enable the user to better control the vehicle. The camera sensor 1204 may be used for various functions, including some that are invisible to the user, or driver. Infrastructure sensors 1206 may provide information from infrastructure while driving, such as from a smart road configuration, bill board information, traffic alerts and indicators, including traffic lights, stop signs, traffic warnings, and so forth. This is a growing area, and the uses and capabilities derived from this information are immense. Environmental sensor 1218 detects various conditions outside, such as temperature, humidity, fog, visibility, precipitation, and so forth. The laser sensor 1212 detects items outside the vehicle and provides this information to adjust control of the vehicle. This information may also provide information such as congestion on a highway, road conditions, and other conditions that would impact the sensors, actions or operations of the vehicle. The sensor fusion controller 1210 optimizes these various functions to provide an approximately comprehensive view of the vehicle and environments.

Continuing with FIG. 14, a communication module 1208 for communication with other vehicles, referred to as V2V communication, is provided. This information may include information invisible to the user, driver, or rider, and may help vehicles coordinate to avoid an accident. Operational sensors 1214 provide information about the functional operation of the vehicle. This may be tire pressure, fuel levels, brake wear, and so forth. The user preference sensors 1216 may be configured to detect conditions that are part of a user preference. This may be temperature adjustments, smart window shading, and so forth.

Many types of sensors may be controlled by the sensor fusion controller 1210. These sensors may coordinate with each other to share information and consider the impact of one control action on another system. In one example, in a congested driving condition, a noise detection module (not shown) may identify that there are multiple radar signals that may interfere with your vehicle. This information may be used by IAM 1250 to adjust the beam size of the MTM antenna sensor 1202 so as to avoid these other signals and minimize interference.

An environmental sensor 1218 may detect that the weather is changing, and visibility is decreasing. In this situation, the sensor fusion controller 1210 may determine to configure the sensors to improve the ability of the vehicle to navigate these new conditions. The actions may include turning off camera or laser sensors or reducing the sampling rate of these visibility-based sensors. This effectively places reliance on the sensor(s) adapted for the current situation. In response, the IAM 1250 configures the MTM antenna sensor 1202 for these conditions as well. For example, the MTM antenna sensor 1202 may reduce the beam width to provide a more focused beam, and thus a finer sensing capability.

In some embodiments, the sensor fusion controller 1210 may send a direct control to the IAM 1250 based on historical conditions and controls. The sensor fusion controller 1210 may also use some of the sensors within system 1200 to act as feedback or calibration for the other sensors. In this way, an operational sensor 1214 may provide feedback to the IAM 1250 and/or the sensor fusion controller 1210 to create templates, patterns and control scenarios. These are based on successful actions or may be based on poor results, where the sensor fusion controller 1210 learns from past actions.

Figure 15:
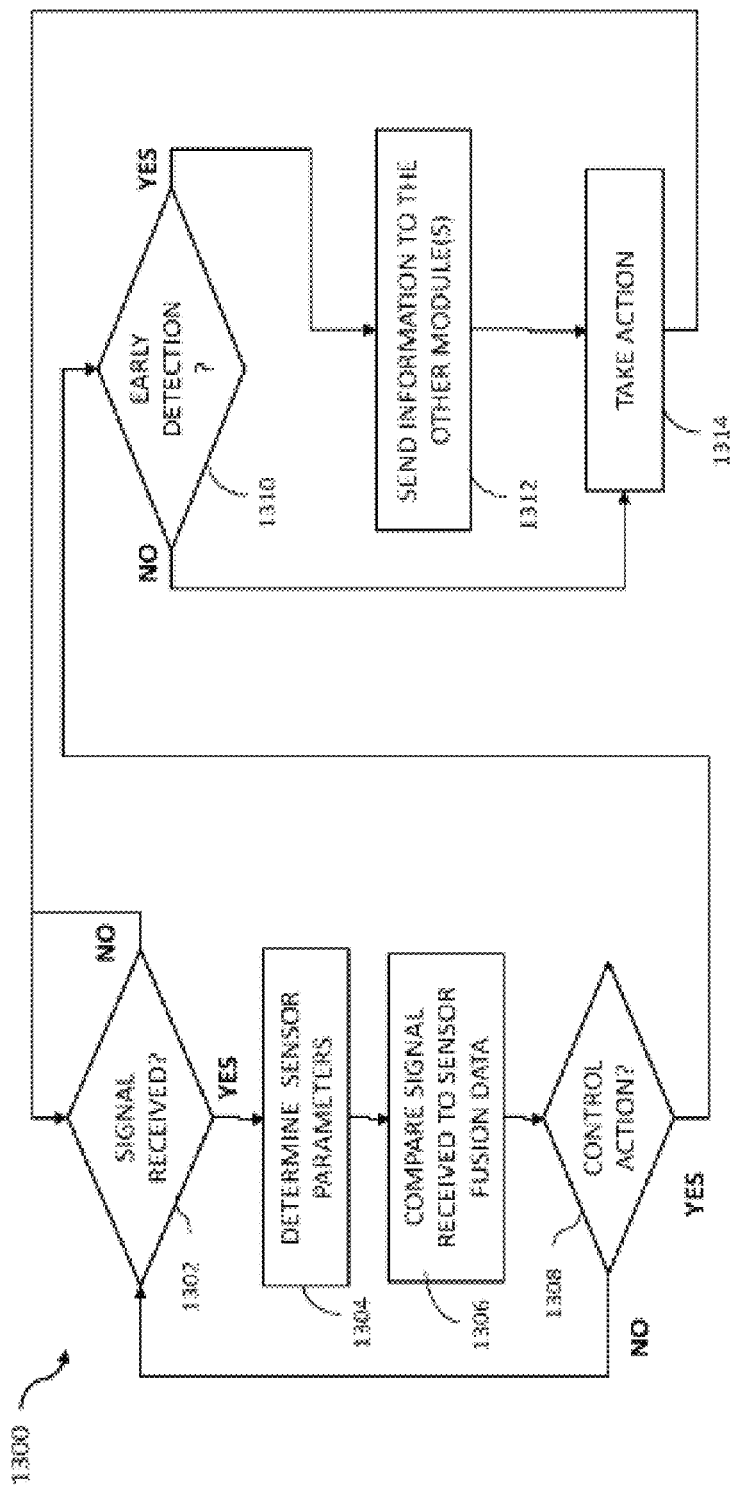
FIGS. 15 and 16 illustrate processes for a sensor fusion system as in FIG. 14, according to embodiments of the present invention.
Figure 16:
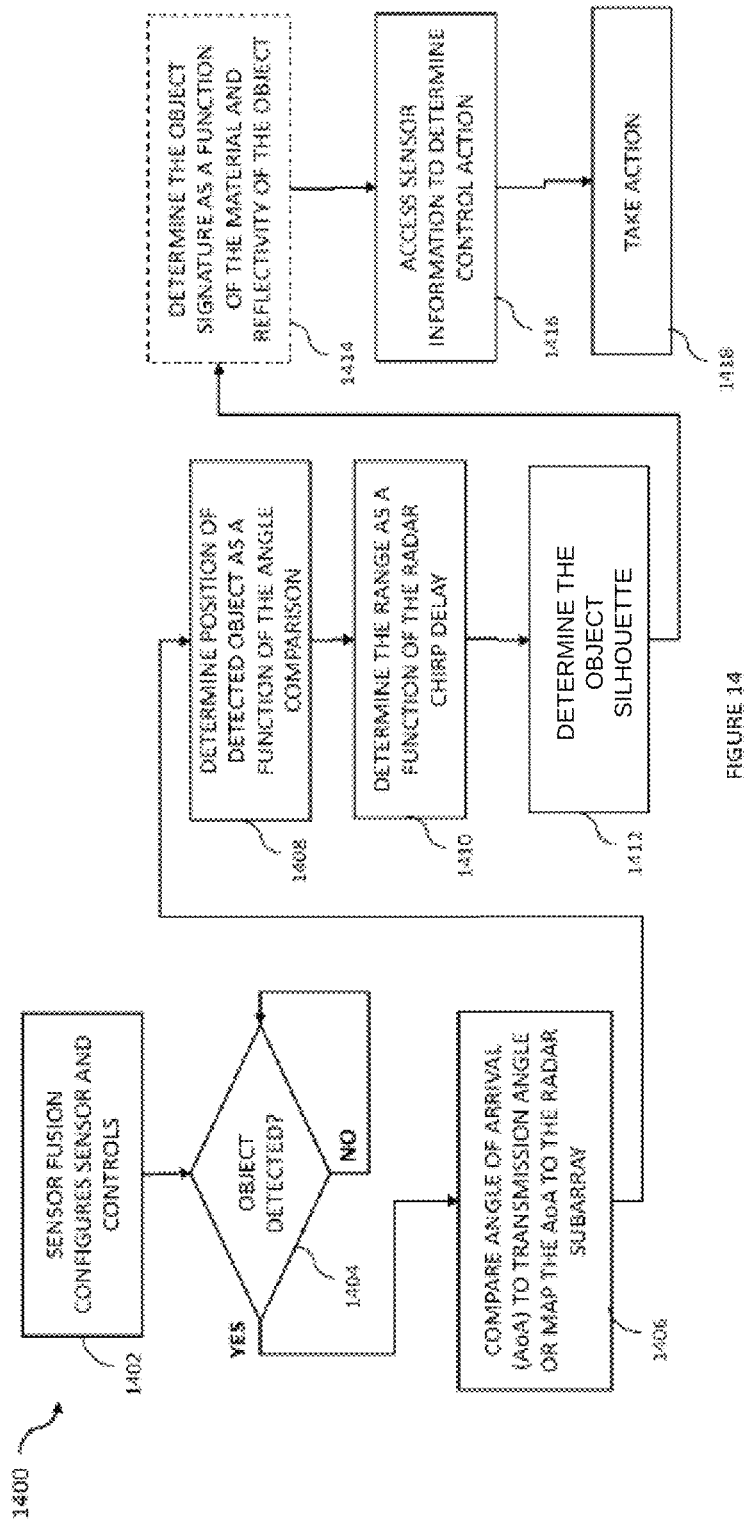

FIGS. 15-16 illustrate processes implemented in the sensor fusion controller 1210, and actions based on sensor readings. In FIG. 15, a process 1300 looks to see if a signal is received from any of the sensors within a system, 1302, such as system 1200 of FIG. 14. If no signal is received, processing continues to listen for sensor signals. When a signal is received, 1302, the sensor fusion controller 1210 determines the sensor parameters, step 1304, which include the information type received from the sensor. This information may be stored for analysis as to actions taken by the vehicle to enable intelligent, flexible, and dynamic control. The process 1300 then continues to compare the signal received to data stored by the sensor fusion controller 1210, step 1306, wherein such data may be stored in memory (not shown) or stored in a networked repository, such as a cloud database and system (not shown). At this point, if a control action is indicated at 1308, processing continues to determine if this control action and/or the information received from the sensor will provide early detection for this or another action. This early detection check, step 1310, allows the entire sensor ecosystem to take advantage of information from any of the sensors in the system 1200. If the sensor information may be used for early detection, step 1310, then the information is sent to one or more modules, step 1312, or is stored in memory as a data point in the current scenario. The system them takes the indicated action, step 1314, and returns to listen for signals at 1302. If the information is not used for early detection at 1310, then processing continues to take the indicated action at 1314. If no control action is indicated at 1308, processing returns to listen for sensor signals.

FIG. 16 illustrates another process 1400 according to some embodiments, wherein the sensor fusion controller 1210 configures sensors and controls for operation at 1402. This may be a dynamic step or may be a persistent configuration. When an object is detected by the MTM antenna sensor 1202 at step 1404, the process 1400 uses that information to calculate or determine specifics relating to the object with respect to the antenna position. The angle of arrival (AoA) is compared to the transmission angle or is mapped to a subarray in the MTM antenna sensor, 1406. This information is used to determine the position of the detected object in 2-D or 3-D space, 1408. The range, or distance from the antenna to the object, is a function of the radar chip delay, 1410. The information from the MTM antenna sensor 1202 and other sensors is used to determine a silhouette and/or footprint of the object, 1412. Optionally, information from the sensor(s) may provide an object signature of the object, 1414, depending on material and so forth. This may be an indication of the reflectivity of the object. The object signature is a more detailed understanding of the object, which may give dimensions, weight, and so forth. The sensor fusion controller 1210 will access sensor information to determine a control action, 1416, and instruct to take action, 1418.

A variety of information is determined from the MTM antenna sensor 1202; such information may be a function of the modulation waveform and technique, the frequency, the chirp delay, the frequency change of the received signal and so forth. The specific radiation pattern used may be crafted to accomplish specific goals according to the application. The sensor fusion controller 1210 enables such control to optimize the system and reduce the processing required. For example, the MTM antenna sensor 1202 may be used to reduce the number of sensor and/or the active time of each sensor. In this way, some sensors may be disabled during certain conditions, and activated on a change in that condition.

Figure 17:
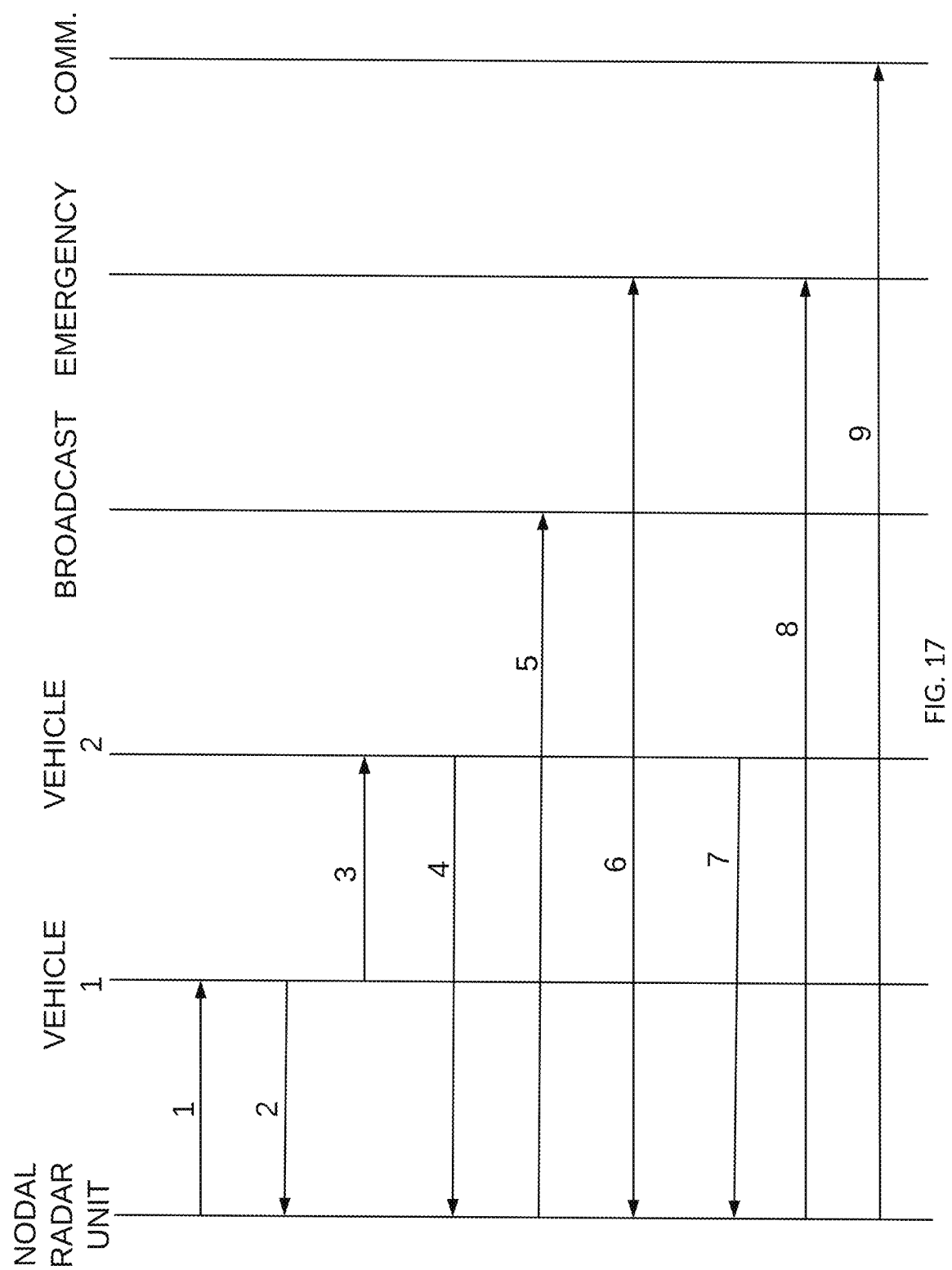
FIG. 17 illustrates a signal flow diagram for operation of a nodal radar system as in FIG. 1, according to embodiments of the present invention.

The nodal radar system of FIG. 1 may implement the various aspects, configurations, processes and modules described throughout this description. In one scenario, the nodal radar system 100 includes both radar functionalities and communication functionalities, enabling object and action detection as well as communication of this information throughout the environment. FIG. 17 illustrates a signal flow diagram between the nodal radar unit 100, vehicles, and communication systems. A first communication may be from the nodal radar system 100 to a first vehicle. This information may be over a communication network, such as a cellular, WiFi or Bluetooth network, or may be a radar-specific communication that provides information, data and/or instructions to a radar system or sensor fusion in the vehicle. The vehicle may respond to the nodal radar system 100 and/or may relay a message or other information to a second vehicle; in response the second vehicle may respond directly to the nodal radar system 100 or may communicate with the first vehicle or other vehicles. This enables the nodal radar system 100 to detect a condition and provide this information to one or more vehicles in a serial manner. The nodal radar system 100 may also send a broadcast or multicast message to multiple receivers throughout the environment, such as broadcast signal 5. Similarly, the nodal radar system 100 may communicate with an emergency system, signal 6. Still further, the nodal radar system 100 may use the communication network for communications beyond the immediate environment.

The present invention provides a nodal radar system that is configured for placement on a stationary or temporarily stationary location in an environment to complement and supplement information of individual vehicles, devices and so forth. The nodal radar system scans the environment, and may incorporate infrastructure information and data, to alert drivers and vehicles as to conditions. The nodal radar system is able to detect objects and actions within the environment.

In some embodiments, the nodal radar system communicates with other nodal radar units throughout the environment to gain and provide advance notice and warnings of activities, such as a speeding car. The nodal radar system may communicate through over the air, wireless systems, such as cellular, WiFi, Bluetooth and near field communication (NFC) methods. The nodal radar system acts as a complement to the sensor fusion within vehicles in the area. The nodal radar system may be part of a stationary sensor fusion module that includes camera, lidar, ultrasound and so forth, so as to be part of a smart city.

What is claimed is:

1. A nodal radar system, comprising:
 a metamaterial radar unit positioned on a stationary infrastructure in an area, comprising:
  a metamaterial array of elements;
  an intelligent antenna metamaterial interface (IAM) that configures and controls at least one subarray within the metamaterial array of elements via a reactance control means coupled to the metamaterial array of elements;
  a sensor fusion controller coupled to the metamaterial array of elements,
 wherein the IAM is configured to enable communication between the sensor fusion controller and the metamaterial array of elements; and
  an object detection engine that interprets received signals; and
 a communication means that enables transmitting of information.

2. The nodal radar system as in claim 1, wherein the IAM further adjusts a beam focus of the metamaterial radar unit.

3. The nodal radar system as in claim 2, wherein adjusting the beam focus comprises controlling the reactance control means.

4. The nodal radar system as in claim 3, wherein the IAM controls the reactance control means that changes a phase of the beam.

5. The nodal radar system as in claim 1, wherein when the object detection engine detects an object, the communication means sends a message to a vehicle.

6. The nodal radar system as in claim 1, wherein the object detection engine further classifies a detected object.

7. The nodal radar system as in claim 6, wherein the object detection engine comprises a neural network engine.

8. The nodal radar system as in claim 7, wherein the neural network engine is a convolutional neural network trained to identify objects from the received signals.

9. The nodal radar system as in claim 7, wherein the object detection engine further comprises a rule base and decision engine that evaluates behavior of the IAM to control the metamaterial array.

10. A nodal radar system, comprising:
 a plurality of sensors positioned on an infrastructure within an environment;

a sensor fusion controller having an interface that receives signals from the plurality of sensors and implements a control action in response to the received signals;

a metamaterial antenna structure coupled to the sensor fusion controller; and an intelligent antenna metamaterial interface (IAM) that enables communication between the sensor fusion controller and the metamaterial antenna structure, wherein the IAM controls subarrays of the metamaterial antenna structure.

11. The nodal radar system, as in claim 10, wherein the infrastructure is a building.

12. The nodal radar system, as in claim 10, wherein the infrastructure is a sign board.

13. The nodal radar system, as in claim 10, wherein the metamaterial antenna structure is adapted to scan a field of view of the nodal radar system.

14. The nodal radar system, as in claim 13, adapted to work in collaboration with distributed radar nodes.

15. The nodal radar system, as in claim 10, further comprising:

a reactance control means coupled to the metamaterial antenna structure, wherein control of the reactance control means changes a phase of a transmission from the metamaterial antenna structure.

16. A nodal metamaterial antenna structure, comprising:

an infrastructure element affixed to the nodal metamaterial antenna structure;

a metamaterial array of unit cells;

a feed structure comprising a super element layer having conductive and non-conductive traces, the feed structure proximate the metamaterial array of unit cells; and a metamaterial array control means that adjusts reactance behavior of the metamaterial array of unit cells so as to change a phase of a transmission signal radiating from the nodal metamaterial antenna structure.

17. The nodal antenna structure as in claim 16, wherein the feed structure comprises:

a first conductive layer having a plurality of discontinuities;

a second conductive layer; and a dielectric layer configured between the first and second conductive layers, wherein a plurality of vias are positioned from the first conductive layer to the second conductive layer through the dielectric layer.

18. The nodal antenna structure as in claim 17, wherein the plurality of vias are conductive.

19. The nodal antenna structure as in claim 18, wherein the plurality of vias define a plurality of super elements within the feed structure.

* * * * *